United States Patent
Narita et al.

(10) Patent No.: US 11,442,677 B2
(45) Date of Patent: Sep. 13, 2022

(54) IMAGE SCANNING DEVICE, METHOD FOR CONTROLLING IMAGE SCANNING DEVICE, AND STORAGE MEDIUM

(71) Applicant: CANON KABUSHIKI KAISHA, Tokyo (JP)

(72) Inventors: Tateki Narita, Tokyo (JP); Kyosuke Nakano, Toride (JP); Daiki Mizoi, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/933,731

(22) Filed: Jul. 20, 2020

(65) Prior Publication Data

US 2021/0034313 A1 Feb. 4, 2021

(30) Foreign Application Priority Data

Jul. 29, 2019 (JP) .............................. JP2019-138590

(51) Int. Cl.
*G06F 3/12* (2006.01)
*H04N 1/00* (2006.01)
*H04N 1/12* (2006.01)

(52) U.S. Cl.
CPC .......... *G06F 3/1267* (2013.01); *G06F 3/1204* (2013.01); *G06F 3/1238* (2013.01); *G06F 3/1274* (2013.01); *H04N 1/0048* (2013.01); *H04N 1/00474* (2013.01); *H04N 1/00477* (2013.01); *H04N 1/12* (2013.01)

(58) Field of Classification Search
CPC .... G06F 3/1267; G06F 3/1238; G06F 3/1204; G06F 3/1274; H04N 1/0048; H04N 1/00477; H04N 1/00474; H04N 1/00408; H04N 1/00954
USPC ......................................................... 358/1.15
See application file for complete search history.

(56) References Cited

U.S. PATENT DOCUMENTS

| | | | |
|---|---|---|---|
| 10,228,889 B2 * | 3/2019 | Kanematsu | H04N 1/32106 |
| 2011/0222103 A1 | 9/2011 | Doui | |
| 2012/0120438 A1 * | 5/2012 | Sato | G06F 3/124 358/1.15 |
| 2015/0062644 A1 * | 3/2015 | Ishii | G06F 3/1204 358/1.15 |
| 2017/0013152 A1 * | 1/2017 | Morii | G06F 3/1238 |
| 2017/0052745 A1 | 2/2017 | Kanematsu et al. | |

FOREIGN PATENT DOCUMENTS

| | | |
|---|---|---|
| CN | 103970491 A | 8/2014 |
| CN | 104147780 A | 11/2014 |
| EP | 2428886 A2 | 3/2012 |
| JP | H08237403 A | 9/1996 |

\* cited by examiner

*Primary Examiner* — Darryl V Dottin
(74) *Attorney, Agent, or Firm* — Canon U.S.A., Inc. IP Division

(57) ABSTRACT

An image scanning device, while suspending scanning of a set of document sheets of a certain unit, execute scanning of a document sheet of another user, and thereafter enable a user to select a job to be resumed from a list of suspended jobs.

16 Claims, 23 Drawing Sheets

FIG. 18

```
                                                                    1801
┌─────────────────────────────────────────────────────────────────┐
│  TO RESUME SCAN, SELECT JOB TO BE RESUMED,      LOGIN: YYY      │
│  AND SELECT YES (START SCAN) BUTTON.                            │
├──────────────────────┬──────────────┬───────────────────────────┤
│ SUSPENDED JOB NAME   │ USER NAME    │ DATE AND TIME ▼           │
├──────────────────────┼──────────────┼───────────────────────────┤
│ SCAN AND SEND        │ XXX          │ 05/23 09:45               │──1802
│ COPY                 │ YYY          │ 05/23 09:52               │
│ SCAN AND SEND        │ ZZZ          │ 05/23 10:02               │
│                                                                 │
│              1803                    1804                       │
│       ┌──────────────────┐    ┌──────────────────┐              │
│       │ YES (START SCAN) │    │  NO (CANCEL JOB) │              │
│       └──────────────────┘    └──────────────────┘              │
└─────────────────────────────────────────────────────────────────┘
```

FIG. 21

| DATE AND TIME | JOB NAME | USER NAME | RESULT |
|---|---|---|---|
| 05/23 09:45 | SCAN AND SEND | XXX | SUSPENDED |
| 05/23 09:46 | COPY | YYY | OK |
| 05/23 09:52 | SCAN AND SEND | XXX (RESUMED BY: YYY) | OK |

JOB HISTORY 1701
1702

IMAGE SCANNING DEVICE, METHOD FOR CONTROLLING IMAGE SCANNING DEVICE, AND STORAGE MEDIUM

BACKGROUND OF THE INVENTION

Field of the Invention

The present disclosure relates to an image scanning device, a method for controlling the image scanning device, and a storage medium that stores a program for performing the control method.

Description of the Related Art

An image scanning device has been developed that when suspending a scan of a document and, thereafter, resuming the scan of the document, handles scanned images as a series of images (refer to Japanese Patent Application Laid-Open No, H08-237403).

During a document scan operation performed in response to an instruction from a certain user, the scan operation may be suspended, and another scan operation of a set of document sheets of another user may be started.

According to existing methods, after a scan of a set of document sheets in response to an instruction from a certain user is suspended, the same user can scan the subsequent document sheets to form a series of images. However, it is not possible to scan a document of another user while the scan of the document is being suspended. In particular, in the case of a multifunction peripheral having an authentication function, it is not possible to suspend a scan of a document of a certain user, scan a document of another user and, thereafter, resume the suspended scan.

SUMMARY OF THE INVENTION

According to the present disclosure, there is provided an image scanning device that is characterized by comprising: a scan unit configured to scan a document; a login unit configured to enable a user to log in to the image scanning device; a control unit configured to execute a job that causes the scan unit to scan a set of document sheets in accordance with an instruction received from a user logged in to the image scanning device by using the login unit; and an interrupt unit configured to suspend a job executed by the control unit, wherein the login unit enables another user to log in to the image scanning device, wherein the control unit executes another job that causes the scan unit to scan a second document with the job being suspended in accordance with an instruction received from the another user logged in to the image scanning device by using the login unit, wherein the control unit enables a display unit to display a list of the jobs suspended by the interrupt unit, after execution of the another job, and wherein the control unit is capable of resuming the job selected by the user from the list of the jobs displayed on the display unit.

Further features of the present disclosure will become apparent from the following description of exemplary embodiments with reference to the attached drawings.

BRIEF DESCRIPTION OF THE DRAWINGS

FIG. 18 illustrates an example of a screen displayed on the operation unit according to the embodiment.

FIG. 21 illustrates an example of a screen for displaying a job history on the operation unit according to the embodiment.

DESCRIPTION OF THE EMBODIMENTS

Exemplary embodiments of the present disclosure are described below with reference to the accompanying drawings.

First Embodiment

Figure 1:
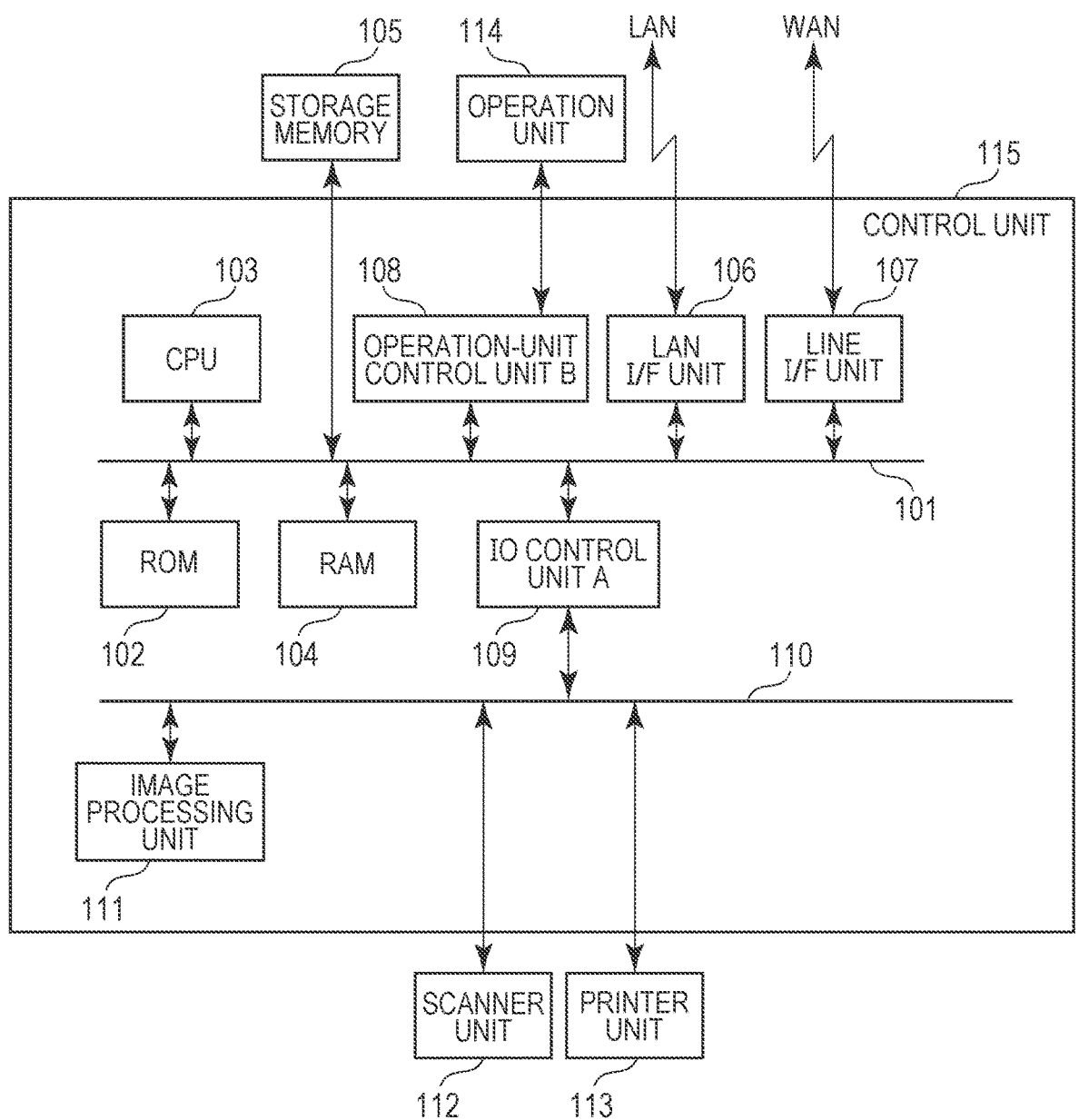
FIG. 1 is a block diagram of the configuration of a multifunction peripheral according to an embodiment.

FIG. 1 is a block diagram of the hardware configuration of a system (e.g., a multifunction peripheral) according to an embodiment of the present disclosure. Unless otherwise specified, the system may be implemented on a single device or a plurality of devices as long as the functions of the present disclosure are achieved.

Each of constituent elements of a control unit 115 is connected to a system bus 101 and an image bus 110. A CPU 103 performs overall control of the system, A read only memory (ROM) 102 stores a system boot program. In addition, the system software that provides the function of each of units of the present invention is stored in the ROM 102 or the storage memory 105. The system software is executed by the CPU 103. A random access memory (RAM)

104 serves as a system work memory area used by the CPU 103 to execute the software. In addition, the RAM 104 serves as an image memory for temporarily storing image data when the image data is processed. The storage memory 105 is used as an internal storage, Scan data from a scanner unit 112, image data, the system software, and the like are stored in the storage memory 105, The storage memory 105 is formed from a hard disk drive (HDD) or a solid state drive (SSD). A local area network (LAN) I/F unit 106 is an interface unit for connecting the system to a LAN, The LAN I/F unit 106 inputs/outputs information from/to each of devices connected to the LAN. A line I/F unit 107 is an interface unit for connecting the system to a WAN and inputs/outputs information to/from each of devices connected to the WAN. The above-described devices are disposed on a system bus 101. An IO control unit A 109 is a bus bridge that connects the system bus 101 to an image bus 110 that transfers image data at high speed. The 10 control unit A 109 converts the data structure of the system bus 101. The image bus 110 is a general-purpose bus, such as a PCI bus, IEEE1394, or PCIEx, Devices described below are disposed on the image bus 110. That is, the image bus 110 connects a scanner unit 112 and a printer unit 113, which are respectively an image input device and an image output device, to an image processing unit 111, and synchronous/asynchronous conversion of image data is performed. The image processing unit 111 is composed of a plurality of ASICs that perform image processing, such as resolution conversion, compression/decompression, and binary multi-value conversion on input and output image data. An operation-unit control unit B 108 for image data serves as an interface unit with an operation unit 114 (UI: User Interface). The operation-unit control unit B 108 outputs, to the operation unit 114, image data to be displayed on the operation unit 114. In addition, the operation-unit control unit B 108 transmits, to the CPU 103, information input from the operation unit 114 by a user of the system. The operation-unit control unit B 108 serves as an I/F unit for software to control the operation unit 114 having a display device, a keypad device, and a card reader device mounted therein. According to the present disclosure, the operation unit 114 is composed of an LCD touch panel or the like. The operation unit 114 interprets a VGA signal output from the operation-unit control unit B 108 and displays an image on the basis of the VGA signal.

Figure 2:
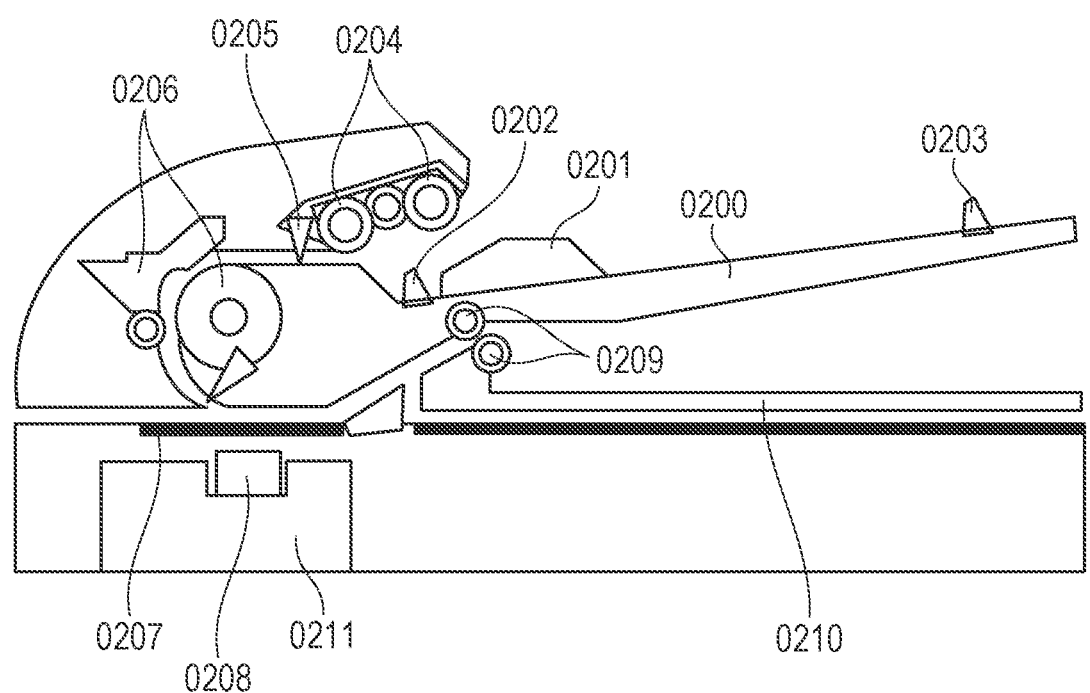
FIG. 2 illustrates the structure of a document feeder (DF) according to the embodiment.

FIG. 2 is a side sectional view of the internal structure of a document feeder (DF) unit of the scanner unit 112, The DF unit includes a document tray 0200 for stacking document sheets to be scanned. The document tray 0200 has, mounted thereon, a document sensor 0202 for detecting the presence of a document, two document guides 0201, and a document size detection sensor 0203. Two document guides 0201 are arranged side by side in the document length direction (a direction perpendicular to the document conveyance direction), Each of the document sheets stacked on the document tray 0200 is fed by three rollers, that is, a pickup roller 0204, a conveyance roller 0206, and a sheet output roller 0209. The pickup roller 0204 is a roller for conveying the document sheet stacked on the document tray 0200 into the document conveyance path inside the DF unit. The conveyance roller 0206 conveys the document sheet conveyed into the document conveyance path by the pickup roller 0204, and the sheet output roller 0209 conveys the document sheet conveyed by the conveyance roller 0206 to a sheet output tray 0210. In addition, the document sheet conveyed by the pickup roller 0204 is detected by a document passage detection sensor 0205, and it is determined whether a first document sheet has passed by on the basis of the time of detection. Although not illustrated, the conveyance roller 0206, the pickup roller 0204, and the sheet output roller 0209 are all driven by a stepping motor. A sub-scanning thinning-out process in the DF unit is accomplished by doubling the frequency of the drive pulse for the above-mentioned conveyance, pickup, and sheet output rollers. The document sheet conveyed by the DF unit is scanned through the DF scanning window 0207 by the CIS 0208 provided on a sensor unit 0211 located below the DF scanning window 0207. The sensor unit 0211 is freely movable in the sub-scanning direction and is also movable in a direction the same as the conveyance direction of the document conveyed from the conveyance roller 0206 toward the sheet output roller 0209. It should be noted that the DF scanning window 0207 has a certain length in the sub-scanning direction, and the CIS 0208 can be moved to any position within this length range. At the position, the CIS 0208 can scan the document sheet. The CIS 0208 is composed of a photoelectric conversion elements, such as a CCD. The CIS 0208 can simultaneously perform a FIFO operation to accumulate pixel signals from each of the elements and generate control signals for controlling the FIFO and the CCD. In general, the CIS 0208 is implemented by arranging a plurality of photoelectric conversion elements in a line.

Figure 3:
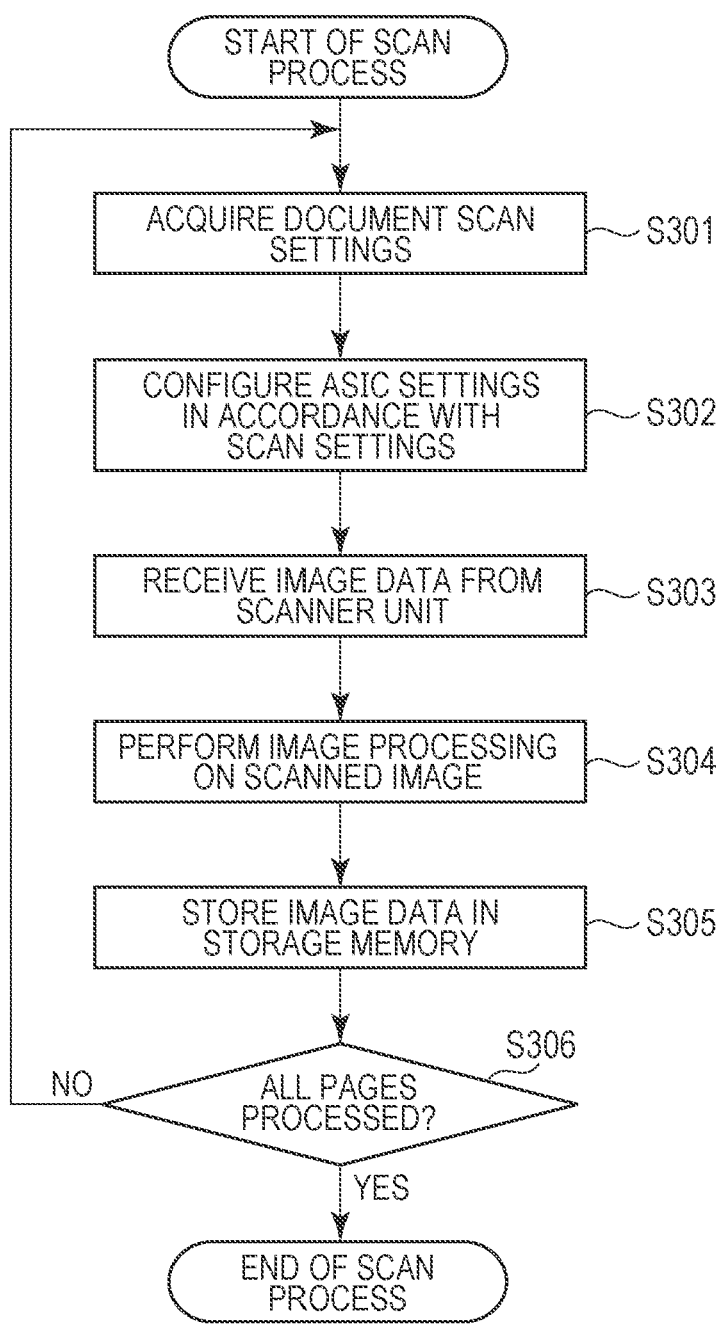
FIG. 3 is a flowchart of the processing according to the embodiment.

A scanning process according to the present embodiment is described below with reference to a flowchart illustrated in FIG. 3, Note that the process represented by the flowchart illustrated in FIG. 3 is accomplished by the CPU 103 loading the program stored in the ROM 102 into the RAM 104 and executing the program. A user operates the operation unit 114 to configure document scan settings. Thereafter, the user presses a start key of the operation unit 114 to start the process described in the flowchart illustrated in FIG. 3. The scan settings set by the user operating the operation unit 114 is stored in the RAM 104.

In step S301, the CPU 103 acquires, from the RAM 104, the document scan settings configured through the operation unit 114.

In step S302, the CPU 103 selects an ASIC to be used for performing a scan operation on the basis of the scan settings acquired in step S301. Thereafter, the CPU 103 configures the settings of the selected ASIC on the basis of the scan settings.

In step S303, the CPU 103 issues a scan start instruction to the scanner unit 112 to cause the scanner unit 112 to convey a document sheet. Thereafter, the CPU 103 causes the scanner unit 112 to scan the document sheet. Thus, the CPU 103 acquires image data generated by the scanner unit 112 scanning the document.

In step S304, the CPU 103 causes the image processing unit 111 to perform image processing on the received image data.

In step S305, the CPU 103 stores, in the storage memory 105, the image data subjected to the image processing.

In step S306, the CPU 103 determines whether a scan of all pages (sheets) of the document has been completed. If the CPU 103 determines that a scan of all pages is not completed, the processing performed by the CPU 103 proceeds to step S301, where the CPU 103 acquires the image data of the next page from the scanner unit 112. If determining that a scan of all pages of the document is completed, the CPU 103 completes the scan of the document.

While the multifunction peripheral described above is performing a scan operation on a document in response to an instruction from one user, another user may want to interrupt the scan operation and perform another scan operation of a set of document sheets.

According to existing methods, after a scan of a set of document sheets in response to an instruction from a certain user is suspended, the same user can scan the subsequent document sheets to form a series of images. However, it is not possible to scan a document of another user while the scan operation of the document is being suspended. In particular, in the case of a multifunction peripheral having an authentication function, it is not possible to suspend the scan operation of a document of a certain user, scan a document of another user properly and, thereafter, resume the suspended scan operation properly.

According to the present embodiment, a mechanism is described in which, even when a scan of a certain set of document sheets is suspended and a scan of another set of document sheets is performed in response to a user's instruction, the result of scanning of each set of document sheets can be obtained properly.

As used herein, a job in which a document is scanned by the scanner unit 112, the image data of the document is generated, and the generated image data is stored in the storage memory 105 is referred to as a "scan job". Note that a scan job may be a copy job in which a document is scanned by the scanner unit 112, the image data of the document is generated, the generated image data is stored in the storage memory 105, and the printer unit 113 performs printing on the basis of the stored image data. Alternatively, the scan job may be a transmission job in which a document is scanned by the scanner unit 112, the image data of the document is generated, and the generated image data is transmitted via the LAN. Still alternatively, the scan job may be a facsimile (FAX) job in which a document is scanned by the scanner unit 112, the image data of the document is generated, and the generated image data is transmitted via a WAN.

In addition, according to the present embodiment, the scan job executed first is referred to as a "prior scan job". A job that interrupts the prior scan job in progress and that is executed with the prior scan job being suspended is referred to as an "interrupt scan Job".

According to the present embodiment, a case where a user executes a prior scan job and another user executes an interrupt scan job is described. A user who executes the prior scan job is referred to as a "first user", and a user who executes the interrupt scan job is referred to as a "second user".

Figure 4:
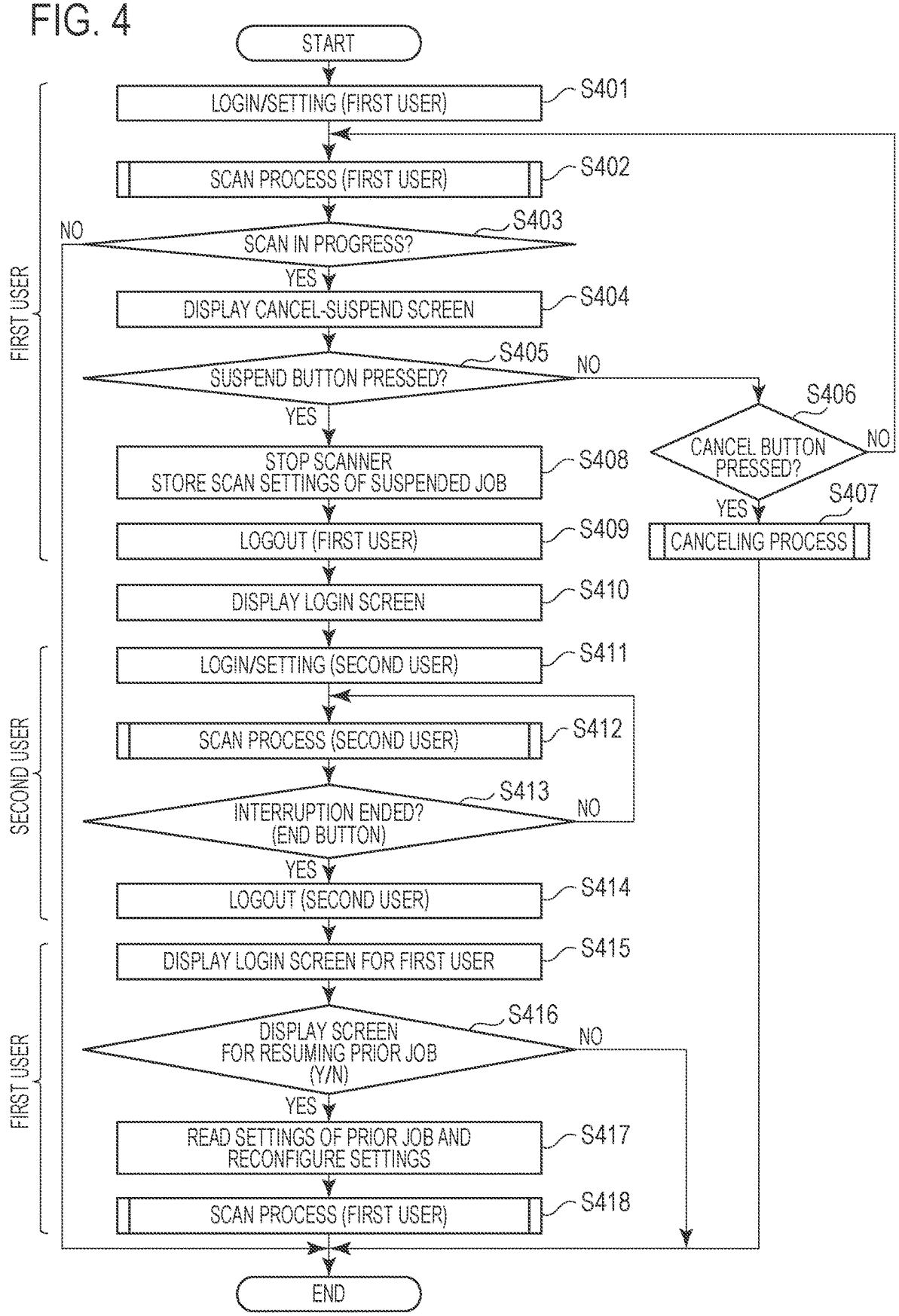
FIG. 4 is a flowchart of the processing according to the embodiment.

The interrupt scan process performed by the control unit 115 according to the first embodiment is described below with reference to FIG. 4, The process represented by the flowchart illustrated in FIG. 4 is accomplished by the CPU 103 loading the program stored in the ROM 102 into the RAM 104 and executing the program.

In step S401, the CPU 103 causes the operation unit 114 to display a login authentication screen.

Figure 9:
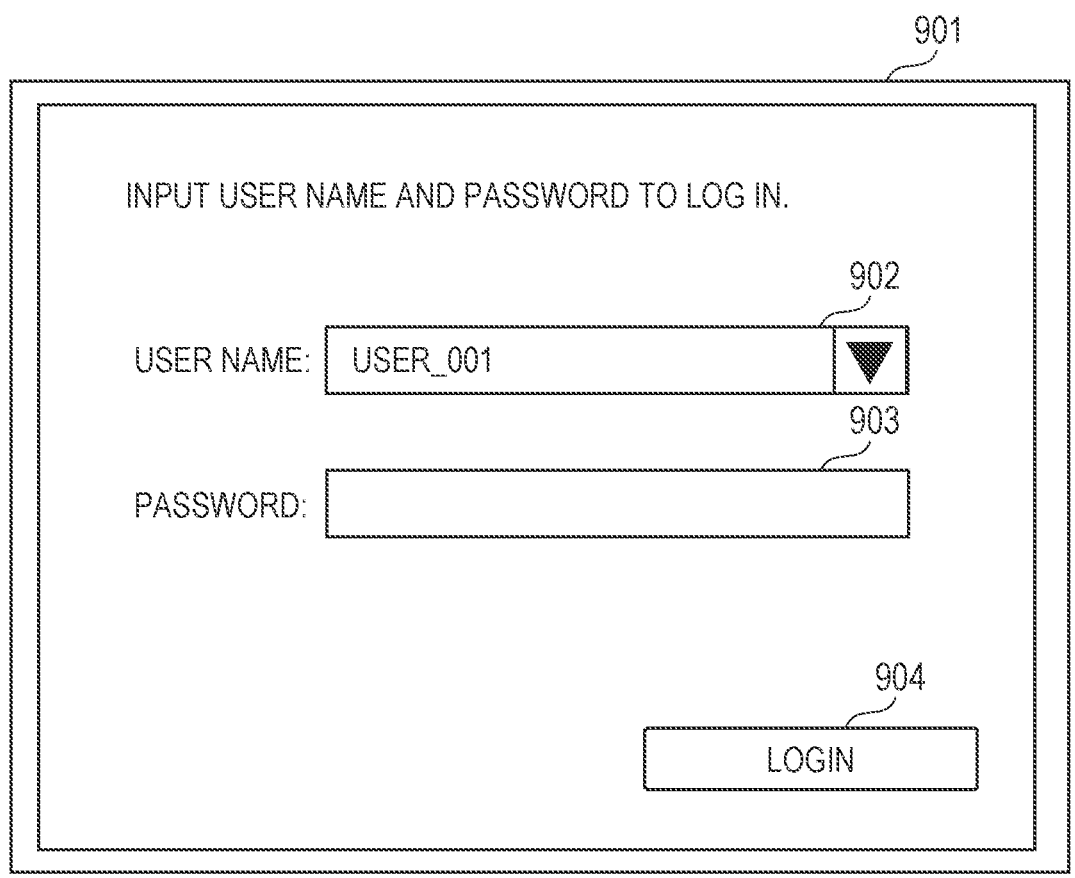
FIG. 9 illustrates an example of a login authentication screen displayed on the operation unit according to the embodiment.

FIG. 9 illustrates an example of a login authentication screen for the user to log in to a multifunction peripheral according to the present embodiment. The operation unit 114 receives a user name and a password input to the screen 901. The user inputs the user name into a user name input field 902, inputs the password into the password input field 903, and presses a login button 904. If the input user name and password match the user name and password pre-stored in the storage memory 105, the multifunction peripheral allows the user to log in. At this time, the CPU 103 stores, in the RAM 104, the user name input into the user name input field 902 as a user name indicating a logged-in user. The user name input field 902 may display a list of registered user names so that the user can input their user name by selecting it from the list.

Figure 10:
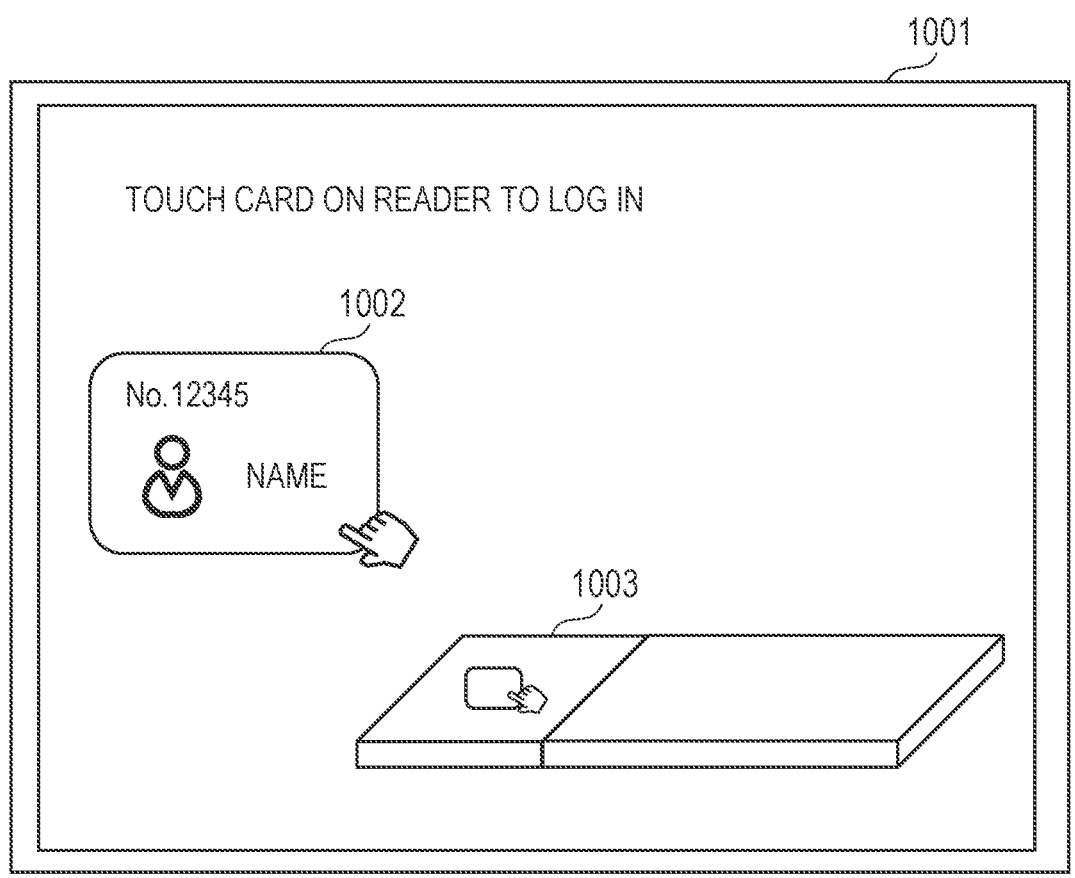
FIG. 10 illustrates another example of a login authentication screen displayed on the operation unit according to the embodiment.

FIG. 10 illustrates another example of the login authentication screen for the user to log in to the multifunction peripheral according to the present embodiment. When a card having the user name and the password recorded therein is held over a card reader provided in the operation unit 114, the multifunction peripheral reads the card ID from the card by near field communication (NFC). An illustration prompting the user to hold the card 1002 over a card reader 1003 of the operation unit 114 is displayed on the screen 1001, When the card 1002 is brought within a predetermined distance of the card reader 1003, the card reader 1003 reads the card. ID from the card 1002, If the card. ID matches the card ID pre-stored in the storage memory 105, the user is allowed to log in. The card ID pre-stored in the storage memory 105 has, recorded therein, a user name corresponding to the card ID, and the CPU 103 can identify the user who logged in to the multifunction peripheral by the user name. The CPU 103 stores, in the RAM 104, the user name corresponding to the card ID as the user name indicating a logged-in user.

In this manner, in step S401, the CPU 103 allows the first user to log in to the multifunction peripheral. In addition, when the first user logs in to the multifunction peripheral, the CPU 103 causes the operation unit 114 to display a document scan setting screen and receives the document scan settings from the first user. The received scan settings are stored in the RAM 104. Note that if the scan job is a transmission job or a FAX job, the scan settings include transmission settings, such as destination setting. If the scan job is a copy job, the scan settings include print settings, such as print density setting. The first user places a set of document sheets on the document tray 0200. Note that the set of document sheets may be placed on the document tray 0200 before the first user logs in.

In step S402, the CPU 103 receives a document scan start instruction from the operation unit 114 and causes the scanner unit 112 to start a scan of a document (scan processing) on the basis of the scan settings stored in the RAM 104. More specifically, the scanner unit 112 conveys the document sheets set on the DF one by one and scans the conveyed document sheets.

In step S403, the CPU 103 determines whether a scan is in progress. If it is determined that the scan is not in progress, the CPU 103 ends the processing illustrated in FIG. 4. However, if the CPU 103 determines that the scan is in progress, the processing performed by the CPU 103 proceeds to step S404.

Figure 6:
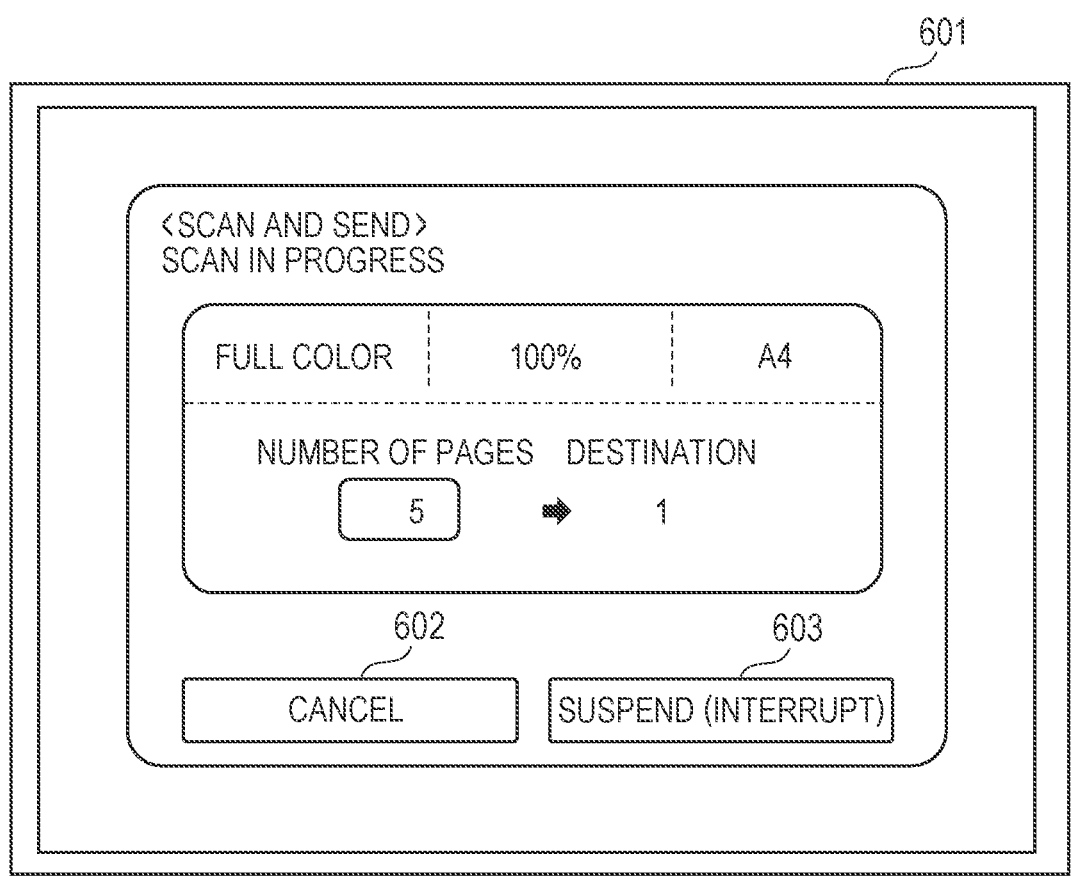
FIG. 6 illustrates an example of a screen displayed on an operation unit according to the embodiment.

In step S404, the CPU 103 causes the operation unit 114 to display a screen for selecting a scan cancel/suspend button, FIG. 6 is an example of a screen for selecting a scan cancel/suspend button. This example is an example of a screen when the scan job is a transmission job. In the screen illustrated in FIG. 6, the scan settings, the number of scanned pages of the document, and the destination of the image data of the document are displayed. The operation unit 114 receives an input for canceling or suspending the scan via a screen 601. If the first user cancels the scan in progress, the first user selects a cancel button 602. However, if the first user suspends the scan in progress for an interrupt scan, the first user selects a suspend (interrupt) button 603.

In step S405, the CPU 103 determines whether the suspend button 603 is selected. If the CPU 103 determines that the suspend button 603 is not selected, the processing proceeds to step S406, where the CPU 103 determines whether the cancel button 602 is selected. If the CPU 103 determines that the cancel button 602 is not selected, the processing proceeds to step S402, where the CPU 103 continues to perform the document scan process and the image processing and storage process on the image data generated by the scan process. However, if determining that the cancel button 602 is selected, the CPU 103 performs a cancel process for canceling the document scan process and an image process and storage process of the image data generated in the scan process.

If, in step S405, the suspend button 603 is selected, the processing performed by the CPU 103 proceeds to step S408.

In step S408, the CPU 103 instructs the scanner unit 112 to stop the document scan process. Upon receiving an instruction to stop the document scan process, the scanner unit 112 continues scanning of the document sheet being conveyed without feeding the next document sheet. Thereafter, the scanner unit 112 outputs the document sheet being conveyed to the sheet output tray 0210. In addition, the CPU 103 reads, from the RAM 104, the scan settings for the scan job and stores, in the storage memory 105, the scan settings for the prior scan job in association with the image data of the prior scan job stored in the storage memory 105. Furthermore, the CPU 103 stores, in the storage memory 105, the user name of the first user in association with the image data.

In step S409, the CPU 103 performs a logout process for the first user.

In step S410, the CPU 103 causes the operation unit 114 to display the login authentication screen illustrated in FIG. 9 or 10.

In step S411, the CPU 103 performs a second login authentication process in response to an operation performed on the login authentication screen by a second user. When the second user logs in to the multifunction peripheral, the CPU 103 causes the operation unit 114 to display a document scan setting screen and receives the document scan settings from the second user. The received scan settings are stored in the RAM 104.

The second user places one or more document sheets on the document tray 0200 after the document scan is suspended in step S408 and before a document scan start instruction is given.

In step S412, the CPU 103 receives the document scan start instruction from the operation unit 114 and starts execution of an interrupt scan job. When the execution of the interrupt scan job starts, the CPU 103 causes the scanner unit 112 to scan a document on the basis of the scan settings stored in the RAM 104 and causes the image processing unit 111 to perform image processing on the image data of the scanned document. In addition, the CPU 103 stores, in the storage memory 105, the image data subjected to the image processing as image data different from the image data of the prior scan job. If the interrupt scan job is a storing job, the image data is stored in the storage memory 105, and the processing of the interrupt scan job ends. If the interrupt scan job is a copy job, the image data of the interrupt scan job is stored in the storage memory 105 and, thereafter, is printed by the printer unit 113. If the interrupt scan job is a transmission job, the image data of the interrupt scan job is stored in the storage memory 105 and, thereafter, is transmitted via the LAN, If the interrupt scan job is a FAX job, the image data of the interrupt scan job is stored in the storage memory 105 and, thereafter, is transmitted via the WAN. When the interrupt scan job is completed, the processing performed by the CPU 103 proceeds to step S413.

In step S413, the CPU 103 causes the operation unit 114 to display an end confirmation screen and receives selection of whether to execute another interrupt scan job.

Figure 7:
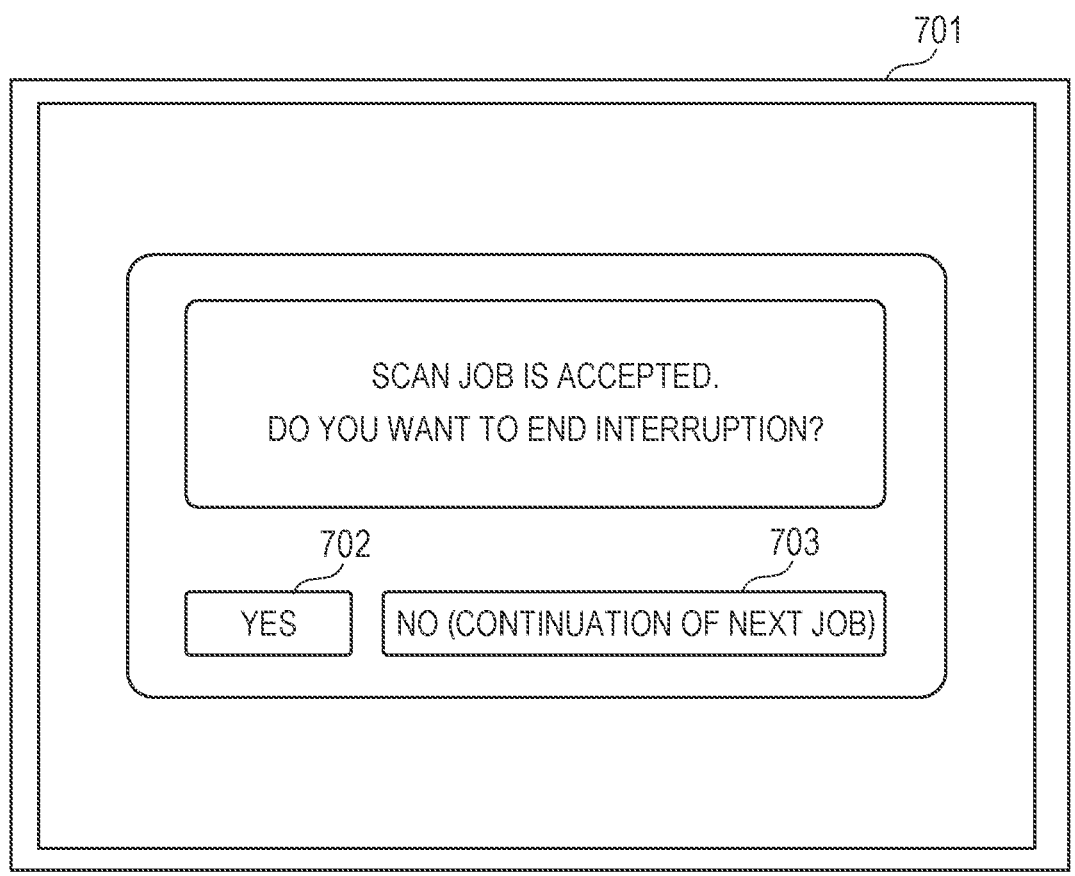
FIG. 7 illustrates an example of a screen displayed on the operation unit according to the embodiment.

FIG. 7 illustrates an example of the end confirmation screen. The user selects a NO (continue next job) button 703 if ending the interrupt scan, and selects a YES button 702 if there is no other interrupt scan job. If the NO (continue next job) button 703 is selected, the processing performed by the CPU 103 proceeds to step S412. However, if the YES button 702 is selected, the processing proceeds to step S414.

In step S414, the CPU 103 causes the second user to log out from the multifunction peripheral.

Figure 8:
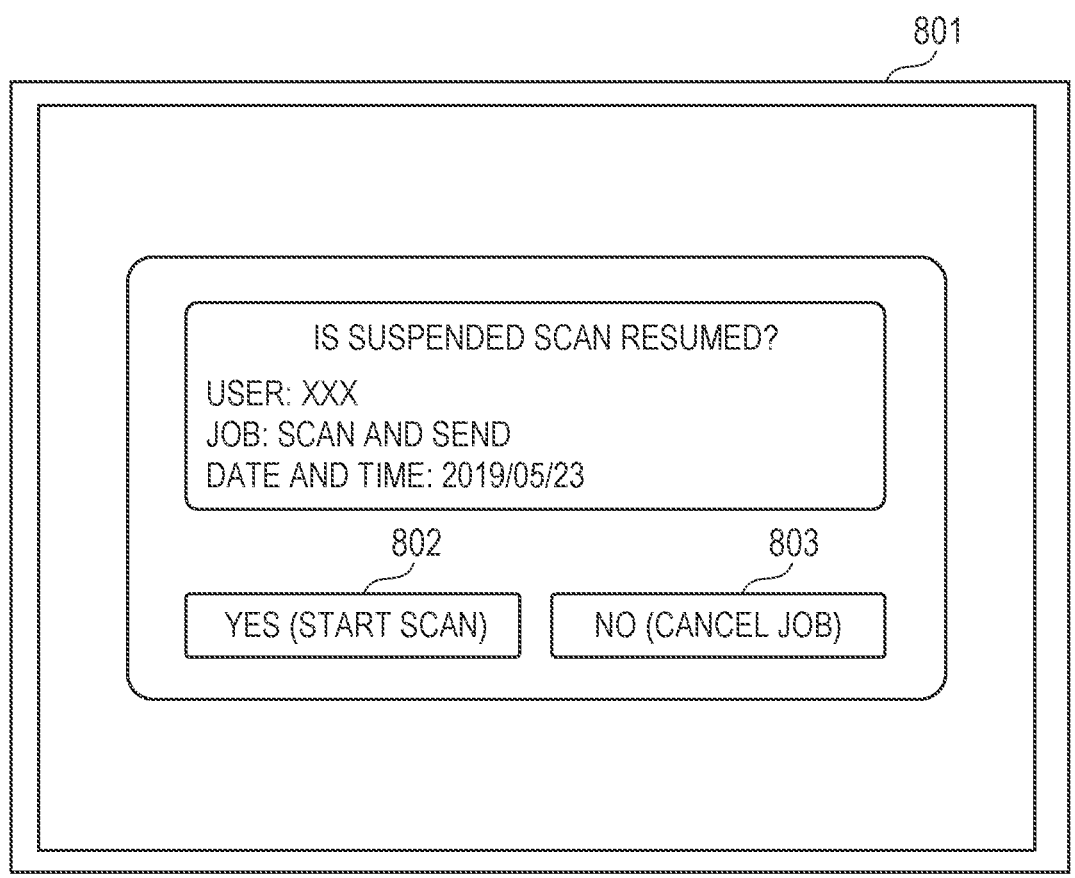
FIG. 8 illustrates an example of a prior scan job resume screen displayed on the operation unit according to the embodiment.

In step S415, the CPU 103 causes the operation unit 114 to display the login authentication screen illustrated in FIG. 9 or 10, In this case, if the login authentication screen illustrated in FIG. 9 is displayed, it is desirable that the user name of the first user, that is, the user who has instructed the execution of the prior scan job, be displayed. This helps users see whose scan job has been suspended. In step S415, the CPU 103 performs login authentication for the first user by the operation of the first user on the login authentication screen and causes the operation unit 114 to display a resume screen for the prior job, FIG. 8 illustrates an example of a prior scan job resume screen. The prior scan job resume screen has, displayed therein, the user name of the user who has instructed to execute the suspended prior scan job, the job type, and the job execution date and time. If a YES (Start Scan) button 802 is selected, the processing performed by the CPU 103 proceeds to step S417, However, if a NO (Cancel Job) button 803 is selected, the CPU 103 ends the process represented by the flowchart illustrated in FIG. 4.

In step S417, the CPU 103 loads the scan settings of the prior scan job from the storage memory 105 onto the RAM 104 and configures the settings of the ASIC on the basis of the loaded scan settings, Thereafter, in step S418, the CPU 103 resumes the execution of the prior scan job by instructing the scanner unit 112 to start a scan of a document (scan processing) on the basis of the scan settings stored in the RAM 104. The image data of the document scanned by execution of the resumed prior scan job is stored as image data following the image data of the prior scan job stored in the storage memory 105 and is stored as one continuous file in the storage memory 105. The file format can be a format specified by the user in the scan settings, Examples of a file format include TIFF and PDF. Since the prior scan job according to the present embodiment is a transmission job, the CPU 103 stores the image data in the storage memory 105 and, thereafter, transmits the image data to a destination set by the user in step S401. If the prior scan job is a copy job, the image data of the prior scan job is stored in the storage memory 105 and, thereafter, the CPU 103 causes the printer unit 113 to perform printing on the basis of the image data. If the prior scan job is a FAX job, the CPU 103 stores the image data of the prior scan job in the storage memory 105 and, thereafter, transmits the image data via the WAN.

By performing control as described above, a mechanism can be provided in which, even when scanning of a certain set of document sheets is suspended and scanning of another set of document sheets is performed in response to a user's instruction, the result of scanning of each set of document sheets can be obtained properly.

Modification of First Embodiment

Figure 5:
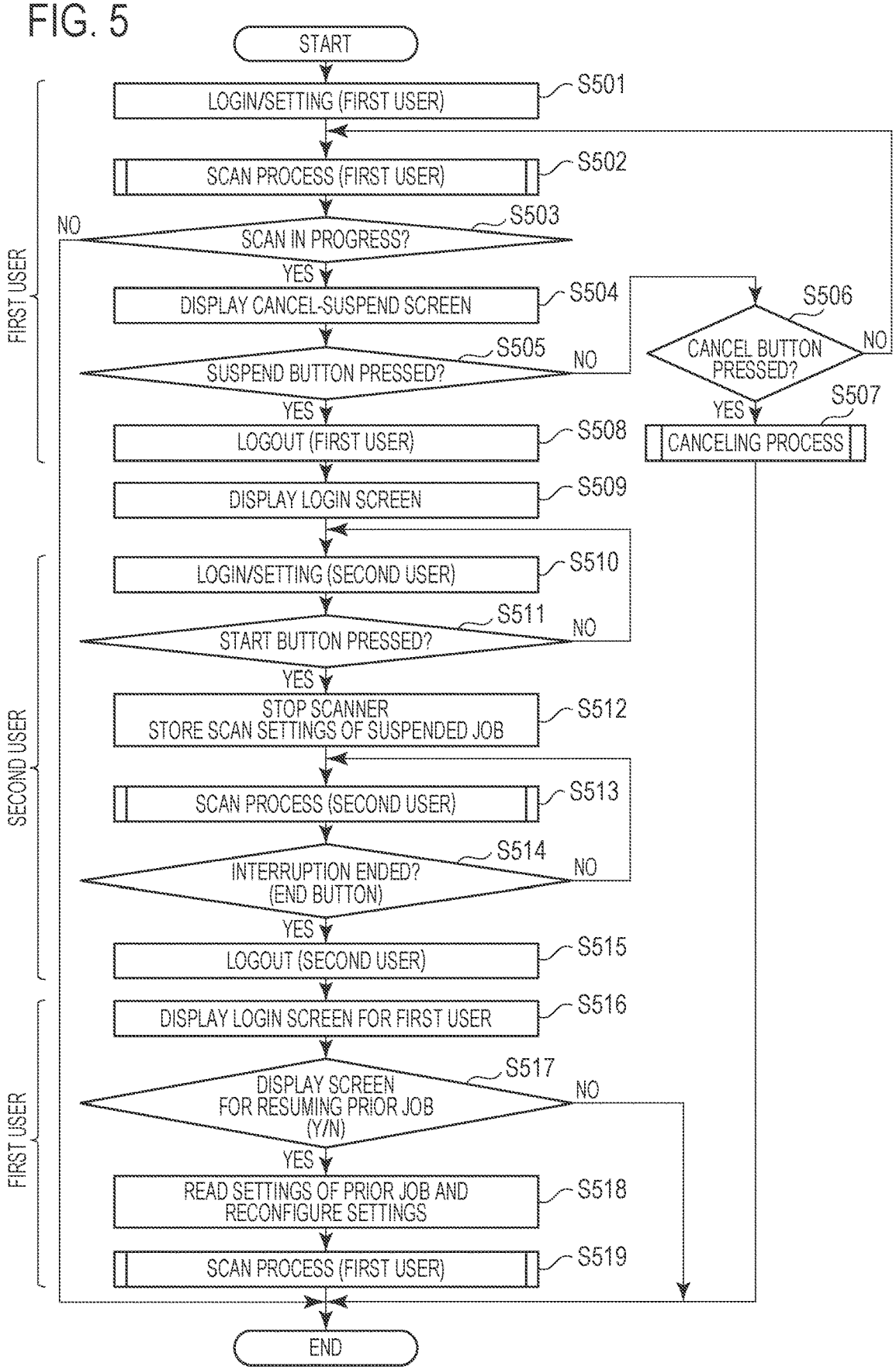
FIG. 5 is a flowchart of the processing according to the embodiment.

Another form of the first embodiment is described with reference to the flowchart illustrated in FIG. 5. Note that the process represented by the flowchart illustrated in FIG. 5 is accomplished by the CPU 103 loading the program stored in the ROM 102 into the RAM 104 and executing the program. Since the processes in steps S501 to S507 are the same as those in steps S401 to S407 illustrated in FIG. 4, respectively, detailed description of the processes is not repeated.

In another form, if, in step S505, it is determined that the suspend button 603 is selected, the CPU 103 causes a first user to log out from the multifunction peripheral in step S508.

The processes in steps S508 to S510 are the same as those in steps S409 to S411 illustrated in FIG. 4, respectively.

In step S511, the CPU 103 determines whether a scan start instruction has been received. If the scan start instruction has been received, the CPU 103 suspends the execution of the prior scan job in step S512, More specifically, the CPU 103 instructs the scanner unit 112 to stop the document scan process. Upon receiving the instruction to stop the document scan process, the scanner unit 112 continues to scan a document sheet being conveyed without feeding the next document sheet and outputs the document sheet being conveyed to the sheet output tray 0210. In addition, the CPU 103 reads, from the RAM 104, the scan settings of the scan job and stores, in the storage memory 105, the scan settings of the prior scan job in association with the image data of the prior scan job stored in the storage memory 105, Furthermore, the CPU 103 stores, in the storage memory 105, the user name of the first user in association with the image data. The processes in steps S513 to S519 are the same as those in steps S412 to S418 illustrated in FIG. 4, respectively.

Second Embodiment

According to the first embodiment, the case where there is only one suspended prior scan job has been described. That is, an example has been described in which execution of the interrupt scan job is not interrupted during the execution of the interrupt scan job.

The second embodiment is described below with reference to an example in which during execution of an interrupt scan job, the execution of the interrupt scan job is interrupted and another interrupt scan job is executed.

The configuration of the multifunction peripheral is the same as that described with reference to FIGS. 1 and 2.

Figure 11:
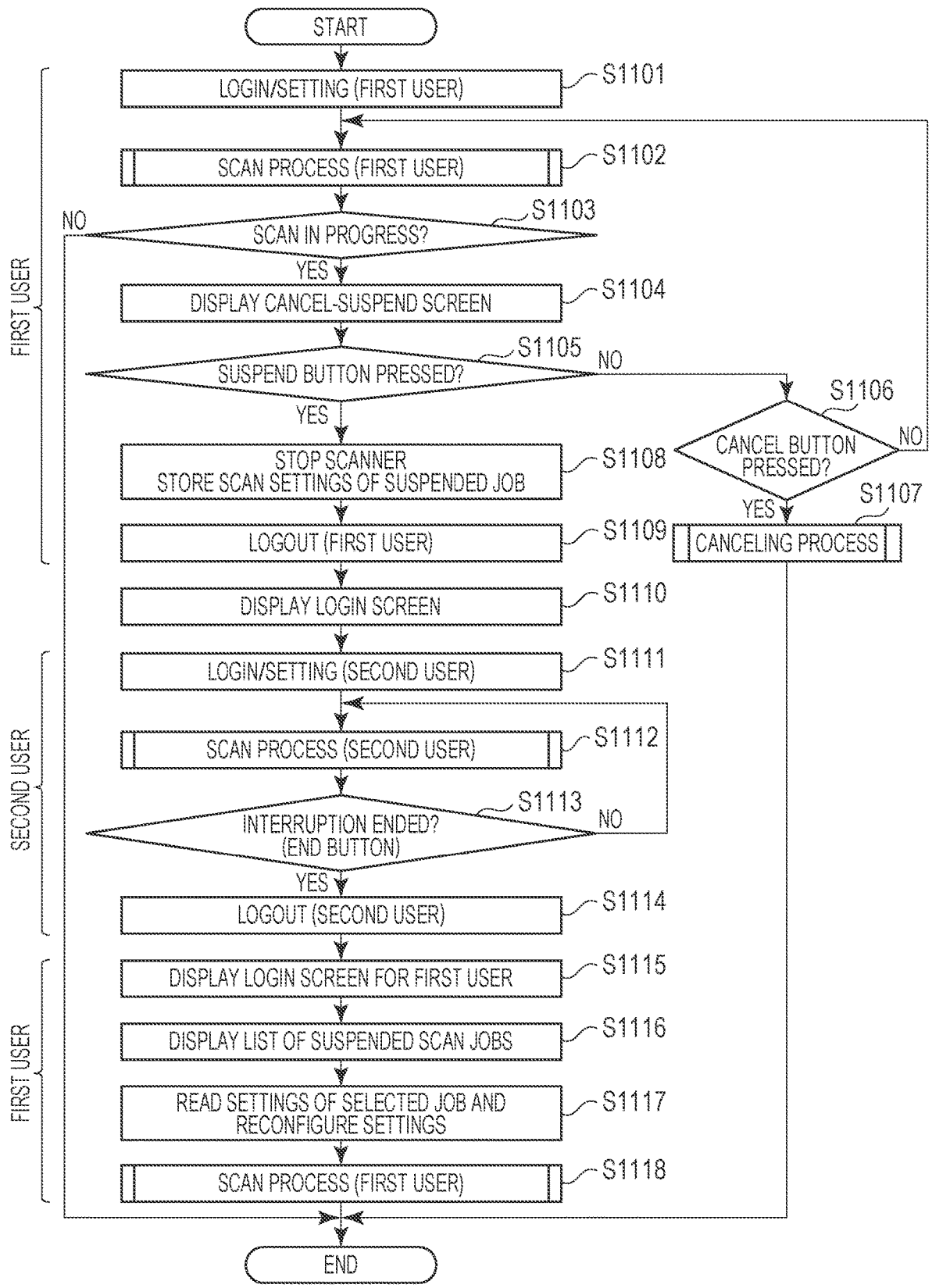
FIG. 11 is a flowchart of the processing according to an embodiment.

FIG. 11 is a flowchart according to the second embodiment. Note that the process represented by the flowchart illustrated in FIG. 11 is accomplished by the CPU 103 loading the program stored in the ROM 102 into the RAM 104 and executing the program.

The processes in steps S1101 to S1115 are almost the same as those in steps S401 to S415 illustrated in FIG. 4, respectively. However, since one process is partially different, the difference is described below. The difference from FIG. 4 is that as illustrated in FIG. 6, a screen including a suspend button is displayed on the operation unit 114 during the scan process in step S1112 so that the interrupt scan job can be further interrupted. If the interrupt scan job is further interrupted, the CPU 103 instructs the scanner unit 112 to stop the document scan process. Upon receiving an instruction to stop the document scan process, the scanner unit 112 continues to scan the document sheet being conveyed without feeding the next document sheet and outputs the document sheet being conveyed to the sheet output tray 0210. Furthermore, the CPU 103 reads, from the RAM 104, the scan settings of the interrupt scan job and stores, in the storage memory 105, the scan settings of the interrupt scan job in association with the image data of the prior scan job stored in the storage memory 105. Still furthermore, the CPU 103 stores, in the storage memory 105, the user name of the second user in association with the image data. Subsequently, the CPU 103 executes a logout process for the second user. Thereafter, the CPU 103 causes the operation unit 114 to display the login authentication screen illustrated in FIG. 9 or 10. The CPU 103 performs a third login authentication process on the login authentication screen in accordance with the operation performed by a third user. In addition, when the third user logs in to the multifunction peripheral, the CPU 103 causes the operation unit 114 to display a document scan setting screen and receives the document scan settings from the third user. The received scan settings are stored in the RAM 104. After the scan of the document is suspended, the third user places one or more document sheets on the document tray 0200 before giving a document scan start instruction. The CPU 103 receives the document scan start instruction from the operation unit 114 and starts execution of an interrupt scan job. When execution of the interrupt scan job is started, the CPU 103 causes the scanner unit 112 to scan the document on the basis of the scan settings stored in the RAM 104 and causes the image processing unit 111 to perform image processing on the image data of the scanned document. Furthermore, the CPU 103 stores, in the storage memory 105, the image data subjected to the image processing as image data different from the image data of the prior scan job and the image data of the previous interrupt scan job. If the interrupt scan job is a storing job, the image data is stored in the storage memory 105, and the processing of the interrupt scan job ends. If the interrupt scan job is a copy job, the image data of the interrupt scan job is stored in the storage memory 105 and, thereafter, is printed by the printer unit 113. If the interrupt scan job is a transmission job, the image data of the interrupt scan job is stored in the storage memory 105 and, thereafter, is transmitted via the LAN. If the interrupt scan job is a FAX job, the image data of the interrupt scan job is stored in the storage memory 105 and, thereafter, is transmitted via the WAN. When the interrupt scan job is completed, the processing performed by the CPU 103 proceeds to step S1113. While description has been made of the use of two interrupt scan jobs, it is possible to interrupt the second interrupt scan job and execute another interrupt scan job, According to the second embodiment, a plurality of interrupt scan jobs can be executed in this way.

In step S1113, if the immediately prior logged-in user gives an instruction to end the interrupt scan, the CPU 103 causes the user to log out from the multifunction peripheral in step S1114.

In step S1115, the CPU 103 causes the operation unit 114 to display the login authentication screen illustrated in FIG. 9 or 10. When a user is authenticated by the operation for authenticating the user, the processing performed by the CPU 103 proceeds to step S111.

In step S1116, the CPU 103 causes the operation unit 114 to display a job list screen including a list of jobs of the users who are authenticated after step S1115 among the suspended jobs.

Figure 13:
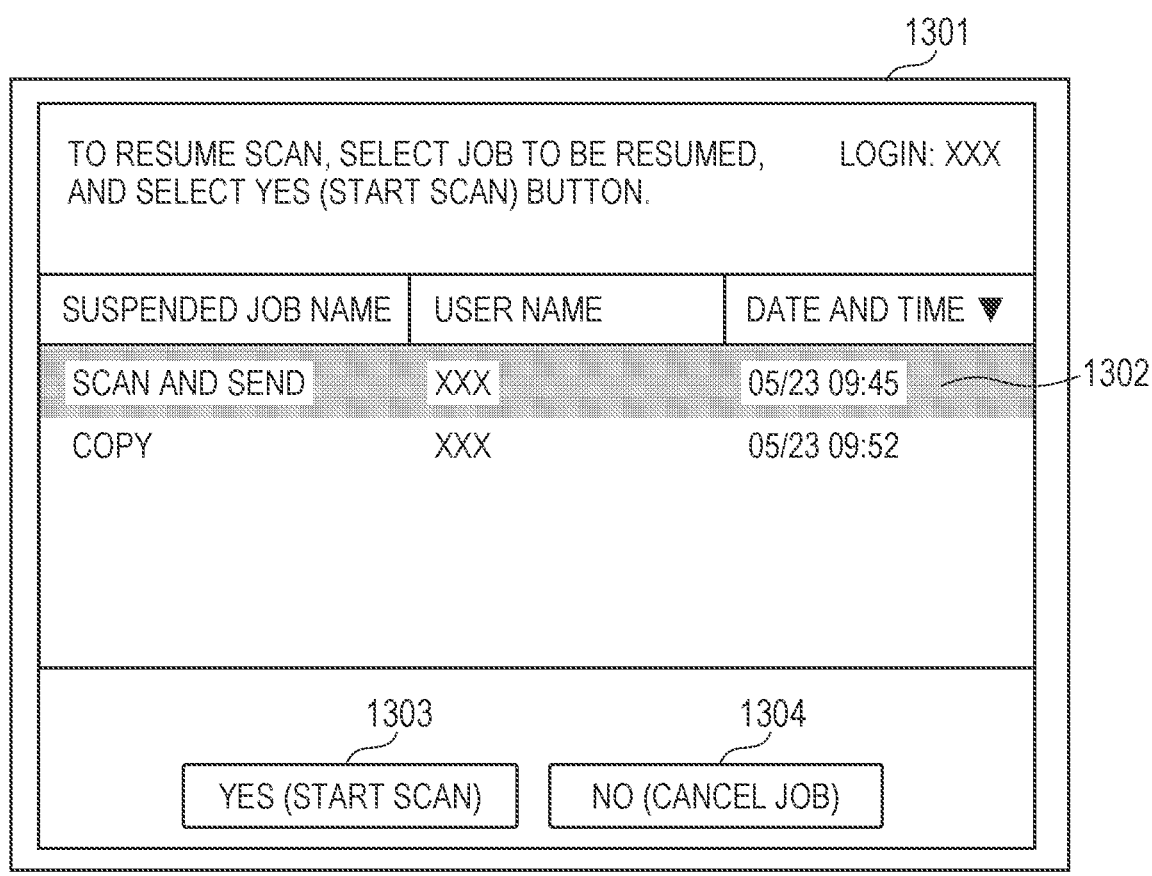
FIG. 13 illustrates an example of a screen displayed on the operation unit according to the embodiment.

FIG. 13 illustrates an example of a job list screen including the list of suspended jobs. The job list screen for the suspended job has, displayed therein, the job name of the suspended job, the user name of the user who executed the job, and the date and time when the execution of the job was instructed for each of the scan jobs. This example of the job list screen is displayed after the user with the user name "XXX" logs in to resume their scan job. The screen 1301 illustrated in FIG. 13 indicates that the prior scan job and two interrupt scan jobs are suspended. At this time, the user selects the scan job to be resumed and, thereafter, selects the YES (Start Scan) button 1303. Note that if the user wants to cancel the suspended scan job, the user selects the scan job to be canceled and selects the NO (Cancel Job) button 1304.

In step S1117, the CPU 103 loads the scan settings of the prior scan job selected in the job list screen from the storage memory 105 onto the RAM 103 and sets the scan settings.

In step S1118, the CPU 103 resumes execution of the selected prior scan job.

By performing the above-described control, it is possible to further interrupt execution of the interrupt scan job during execution of the interrupt scan job and execute another interrupt scan job. In this case, the document scan result of each of the scan job can be properly obtained.

Modification of Second Embodiment

Figure 12:
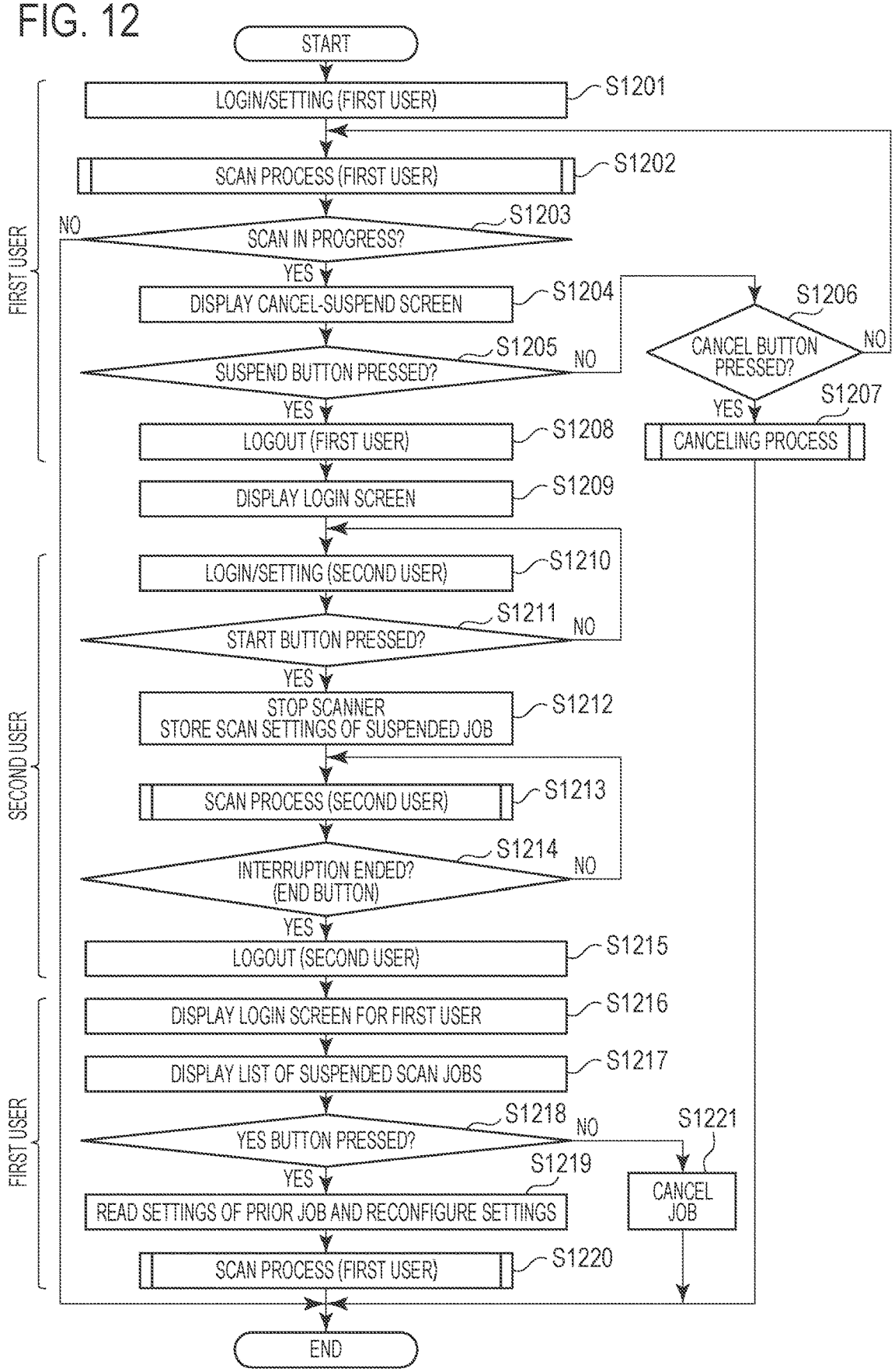
FIG. 12 is a flowchart of the processing according to the embodiment.

Another form of the second embodiment is described below with reference to a flowchart illustrated in FIG. 12. Note that the process represented by the flowchart illustrated in FIG. 12 is accomplished by the CPU 103 loading the program stored in the ROM 102 into the RAM 104 and executing the program. The processes in steps S1201 to S1216 illustrated in FIG. 12 are the same as those in steps S501 to S516 illustrated in FIG. 5, respectively.

According to another form, in step S1217, the CPU 103 causes the operation unit 114 to display the job list screen of suspended jobs.

FIG. 13 illustrates an example of the job list screen of suspended jobs. The job list screen of suspended jobs has, displayed therein, the job name of the suspended job, the user name of the user who executed the job, and the date and time when the execution of the job was instructed for each of the scan jobs. The user selects a scan job to be resumed and, thereafter, selects the YES (Start Scan) button 1303. If the user wants to cancel a suspended scan job, the user selects the scan job to be canceled and, thereafter, selects the NO (Cancel Job) button 1304.

In step S1218, the CPU 103 determines whether the YES (Start Scan) button 1303 is selected. If it is determined that the YES (Start Scan) button 1303 is selected, the processing performed by the CPU 103 proceeds to step S1219, However, if it is determined that the NO (Cancel Job) button 1304 is selected, the processing proceeds to step S1221.

In step S1219, the CPU 103 loads the scan settings of the prior scan job selected in the job list screen from the storage memory 105 onto the RAM 103 and sets the scan settings.

In step S1220, the CPU 103 resumes execution of the selected prior scan job.

If the processing proceeds to step S1221, the CPU 103 cancels the prior scan job selected in the job list screen. Thereafter, the CPU 103 ends the processing.

Third Embodiment

According to the first and second embodiments, the method has been described in which the prior scan job is interrupted, the interrupt scan job is executed and, thereafter, the prior scan job is resumed. However, the user may want to give priority to completion of the prior scan job. For this reason, according to the third embodiment, setting for permitting or prohibiting execution of the interrupt scan (hereinafter referred to as "interrupt scan enable/disable setting") is provided. The user who executes the prior scan job can give priority to execution of the prior scan job by setting the interrupt scan enable/disable setting to "disabled".

According to the third embodiment, a step of setting the interrupt scan enable/disable setting that determines whether execution of an interrupt scan is enabled or disabled is added to the flowchart illustrated in FIG. 4 according to the first embodiment. Note that the differences between the first and second embodiments are only two points, that is, whether there is a single prior scan job or a plurality of prior scan jobs and how to resume the prior scan job after completion of an interrupt scan. The interrupt scan enable/disable setting is not influenced by the differences. Furthermore, the difference between the first embodiment and the modification of the first embodiment and the difference between the second embodiment and the modification of the second embodiment are related to the way of interruption. For this reason, the interrupt scan enable/disable settings are not influenced by the differences, Therefore, description is not repeated of the form in which the interrupt scan enable/disable setting is additionally provided to the first embodiment, the modification of the first embodiment, the second embodiment, and the modification of the second embodiment.

The configuration of the multifunction peripheral is the same as that described with reference to FIGS. 1 and 2.

Figure 14:
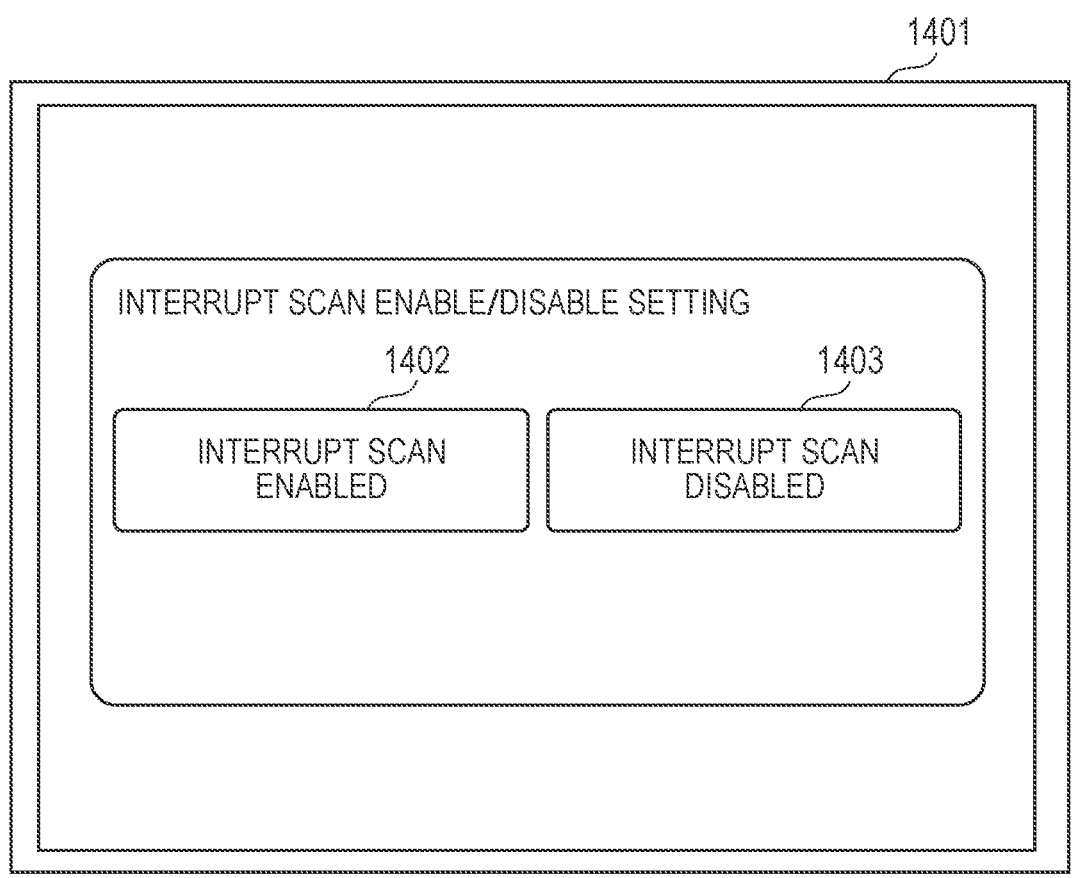
FIG. 14 illustrates an example of a screen displayed on the operation unit according to an embodiment.

A method for changing the interrupt scan enable/disable setting by using the operation unit 114 is described with reference to FIG. 14. The interrupt scan enable/disable setting is set in advance as the device settings of the multifunction peripheral. A screen 1401 is a setting screen for changing the interrupt scan enable/disable setting.

If the CPU 103 determines that an interrupt scan enable button 1402 or an interrupt scan disable button 1403 is selected, the setting is stored in the storage memory 105. Note that the interrupt scan enable/disable setting may be set for each of jobs. In this case, the CPU 103 stores, in the RAM 104, the selected interrupt scan enable/disable setting in association with the job scan settings.

Figure 15:
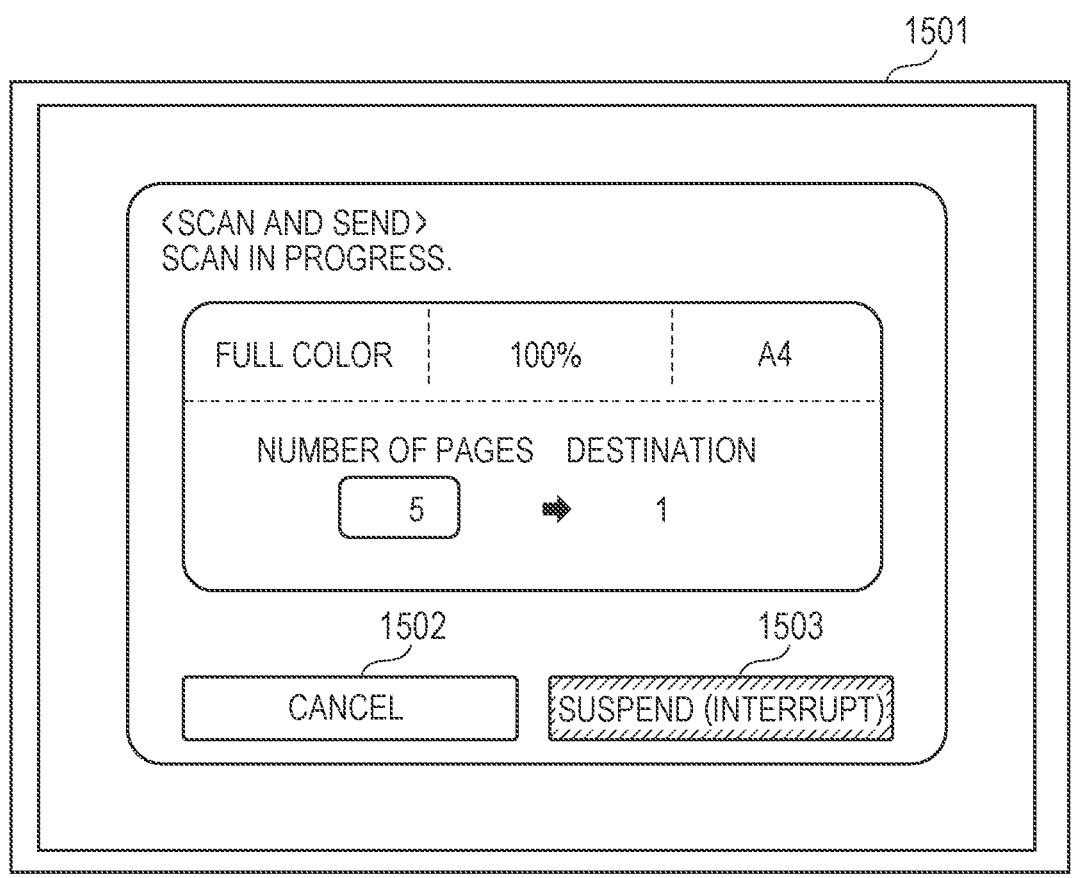
FIG. 15 illustrates an example of a screen displayed on the operation unit according to the embodiment.

A screen 1501 illustrated in FIG. 15 is an example of a screen displayed on the operation unit 114 instead the screen illustrated in FIG. 6 if the interrupt scan enable/disable setting is set to "disabled".

The CPU 103 refers to the interrupt scan enable/disable setting stored in the storage memory 105, If the referred setting is set to "disabled", a screen in which a suspend button 1503 is grayed out is displayed, so that the suspend button 1503 is unselectable. That is, the CPU 103 does not receive an instruction to execute an interrupt scan through an operation performed on the screen illustrated in FIG. 15. Note that the suspend button 1503 may be hidden instead of being grayed out. If the interrupt scan enable/disable setting is included in the scan settings for each job, the CPU 103 can refer to the interrupt scan enable/disable setting stored in the RAM 104.

However, if the interrupt scan enable/disable setting is set to "enabled", the CPU 103 performs control so that the screen illustrated in FIG. 6 is displayed. In the screen illustrated in FIG. 6, the scan job in progress is suspended by selecting the suspend (interrupt) button 603.

Figure 16A:
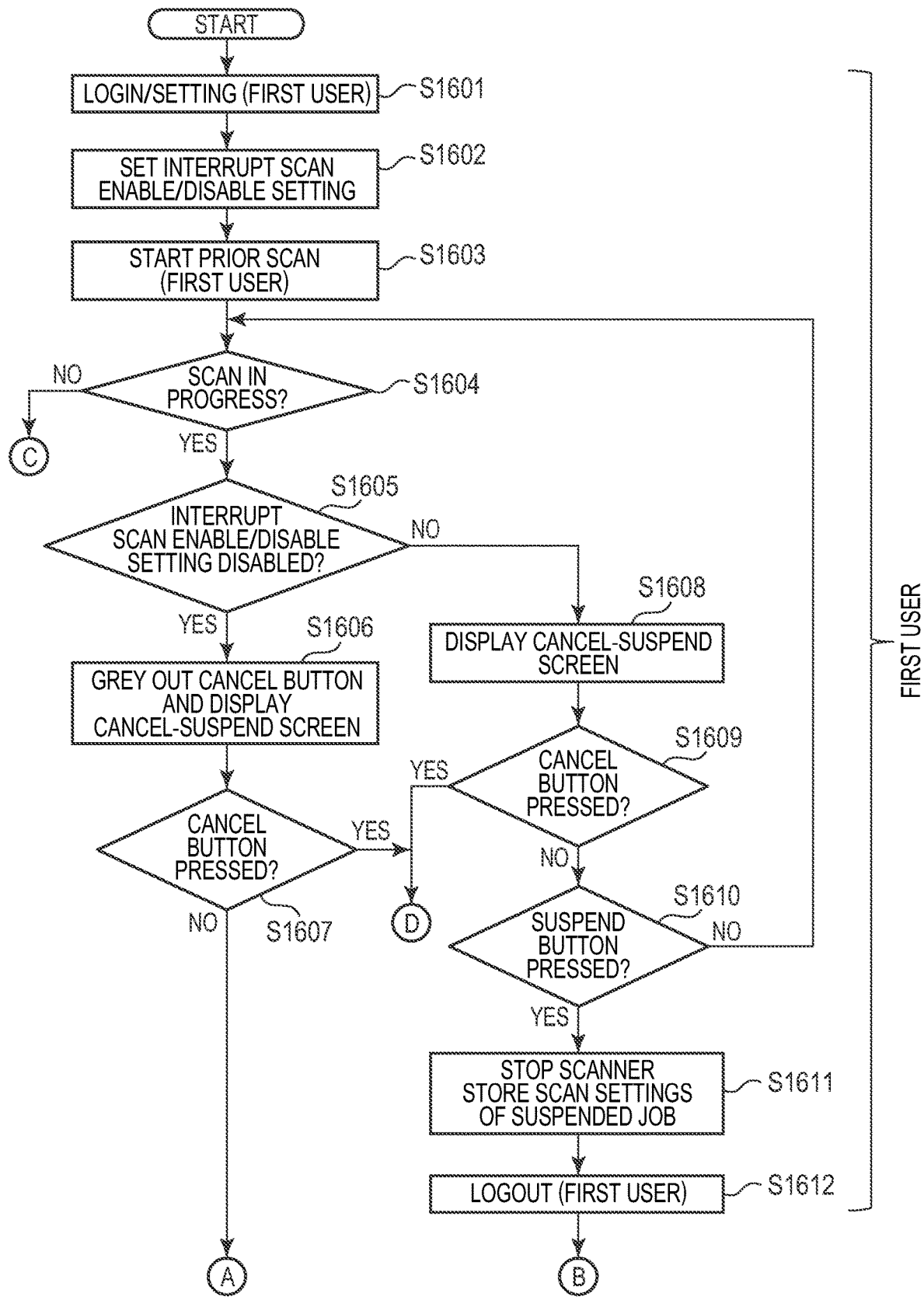
FIG. 16, composed of FIGS. 16A and 16B, is a flowchart of the processing according to the embodiment.
Figure 16B:
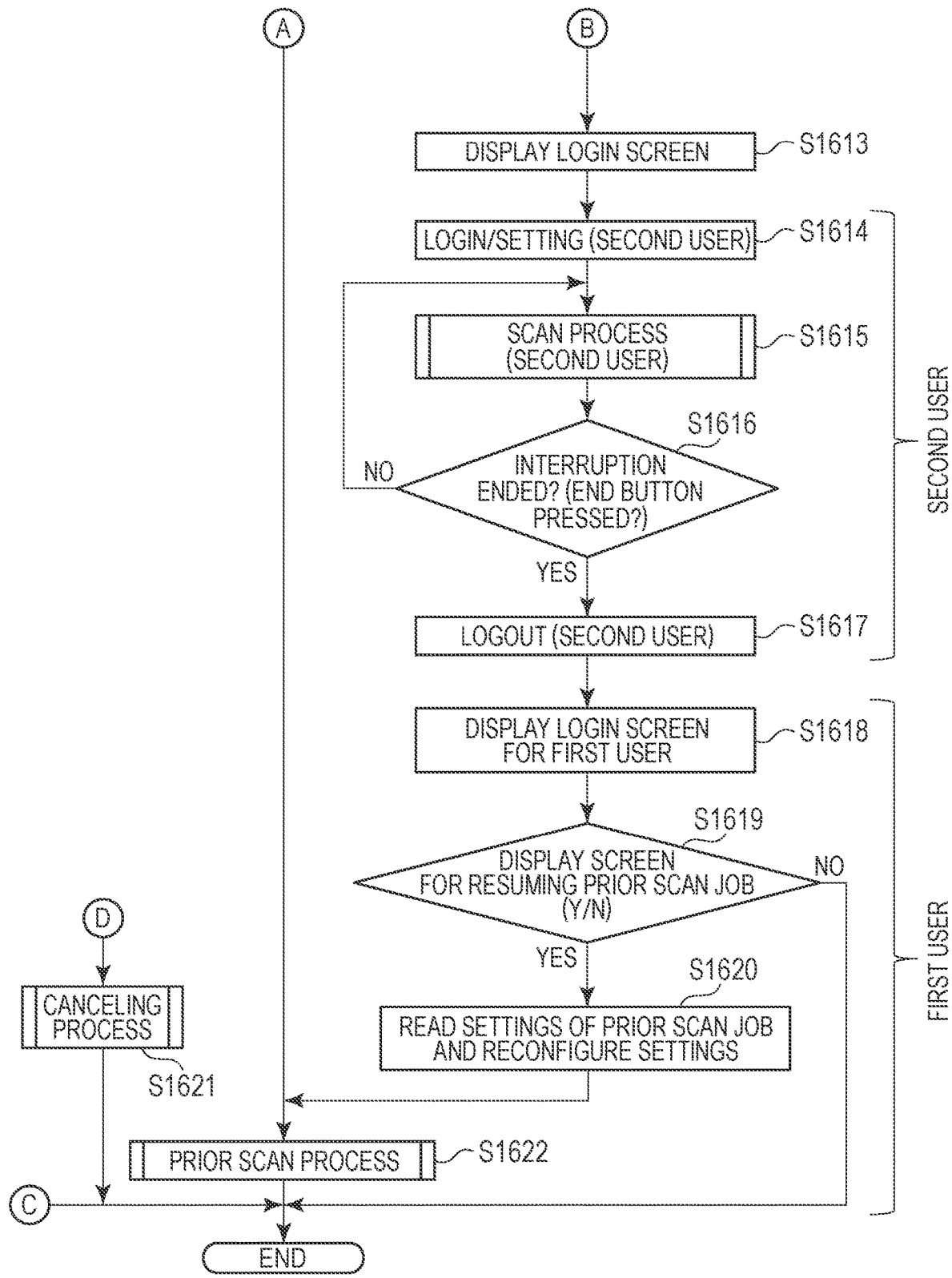

FIGS. 16A and 16B are a flowchart of the interrupt scan operation performed by the control unit 115 according to the third embodiment, Note that the process represented by the flowchart illustrated in FIGS. 16A and 16B is accomplished by the CPU 103 loading the program stored in the ROM 102 into the RAM 104 and executing the program.

Since the process in step S1601 is the same as that in step S401 illustrated in FIG. 4, description of the process is not repeated.

In step S1602, the operation unit 114 receives the input of the interrupt scan enable/disable setting, and the CPU 103 stores the received setting in the storage memory 105. Note that the stored setting is applied to a plurality of jobs to be executed until the setting is changed. However, if the interrupt scan enable/disable setting is included in the job settings, the CPU 103 stores the received setting in the RAM 104 instead of in the storage memory 105, and the setting stored in the RAM 104 is used in preference to the setting stored in the storage memory 105.

If it is determined that a scan start instruction is received via the operation unit 114, the CPU 103 starts a scan job in step S1603. More specifically, the CPU 103 causes the scanner unit 112 to start a document scan and causes the image processing unit 111 to perform image processing on the image data of the scanned document on the basis of the scan settings. The image data subjected to the image processing is stored in the storage memory 105.

In step S1604, the CPU 103 determines whether a scan is in progress. If it is determined that the scan is in progress, the processing performed by the CPU 103 proceeds to step S1605. However, if it is determined that a scan is not in progress, the CPU 103 ends the processing.

In step S1605, the CPU 103 refers to the interrupt scan enable/disable setting stored in the storage memory 105 and switches the processing in accordance with the setting. However, if the interrupt scan enable/disable setting is included in the job settings, the CPU 103 refers to the interrupt scan enable/disable setting stored in the RAM 104 instead of referring to the interrupt scan enable/disable setting stored in the storage memory 105. If the interrupt scan enable/disable setting indicates that an interrupt scan is disabled, the processing performed by the CPU 103 proceeds to step S1606. However, if the interrupt scan enable/disable setting indicates that an interrupt scan is enabled, the processing proceeds to step S1608.

In step S1606, the CPU 103 causes the operation unit 114 to display the screen illustrated in FIG. 15.

In step S1607, the CPU 103 determines whether a cancel button 1502 has been pressed. If the CPU 103 determines that the cancel button 1502 has been pressed, the processing performed by the CPU 103 proceeds to step S1621, where the CPU 103 cancels the scan job in progress. However, if it is determined that the cancel button has not been pressed, the processing proceeds to step S1622, where the scan job in progress continues until the scan job is completed, Thereafter, the processing ends. When the scan job in progress is completed, the screen illustrated in FIG. 15 stops being displayed.

In step S1608, the CPU 103 causes the operation unit 114 to display the screen illustrated in FIG. 6.

In step S1609, the CPU 103 determines whether the cancel button 602 has been pressed in the screen illustrated in FIG. 6, If the CPU 103 determines that the cancel button 602 has been pressed, the processing performed by the CPU 103 proceeds to step S1621, where the CPU 103 cancels the scan job in progress. However, if the CPU 103 determines that the cancel button 602 has not been pressed, the processing proceeds to step S1610.

In step S1610, the CPU 103 determines whether a suspend (interrupt) button 603 in the screen illustrated in FIG. 6 has been pressed. If the CPU 103 determines that the suspend button 603 has been pressed, the processing performed by the CPU 103 proceeds to step S1611, where the CPU 103 executes an interrupt scan. However, if the CPU 103 determines that the suspend button 603 has not been pressed, the CPU 103 proceeds to step S1604.

Since the processes in steps S1611 to S1620 are the same as those in steps S408 to S417 illustrated in FIG. 4, respectively, detailed description of the processes is not repeated.

By performing control as described above, the user can configure the settings so that execution of an interrupt scan is permitted or prohibited (hereinafter, referred to as the interrupt scan enable/disable setting). In particular, the user who executes a prior scan job can give priority to execution of the prior scan job by setting the interrupt scan enable/disable setting to "disabled".

According to the third embodiment, the screen illustrated in FIG. 15 is displayed only after the execution of the scan job is instructed. It is desirable that a mechanism be provided in which, before the screen illustrated in FIG. 15 is displayed, the value of the interrupt scan enable/disable setting set as the device settings of the multifunction peripheral is informed to the user.

FIGS. 17A to 17D illustrate examples of screens that display information about the interrupt scan implementation enable/disable setting.

Figure 17A:
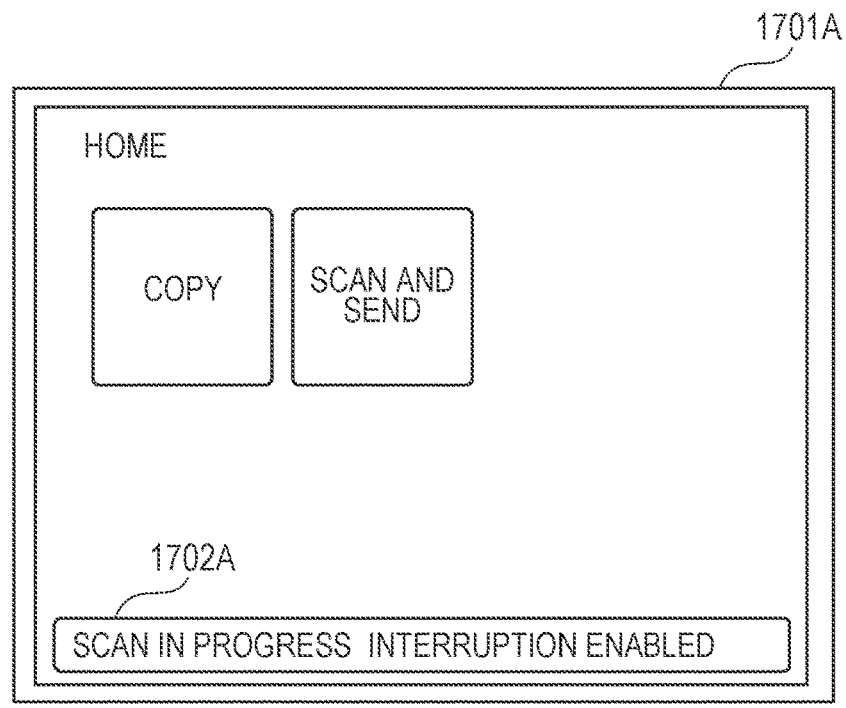
FIGS. 17A, 17B, 17C and 17D illustrate examples of information as to whether an interrupt scan is enabled or disabled displayed on the operation unit according to the embodiment.

A screen 1701A illustrated in FIG. 17A is a home screen of the multifunction peripheral. The home screen is displayed immediately after the user performs an authentication operation on the login authentication screen and, thus, the user is authenticated. An object used to display a copy job setting screen and an object used to display a transmission job setting screen are displayed, Information as to whether the interrupt scan is enabled or disabled is displayed in a status line 1702A on the bottom of the home screen.

Figure 17B:
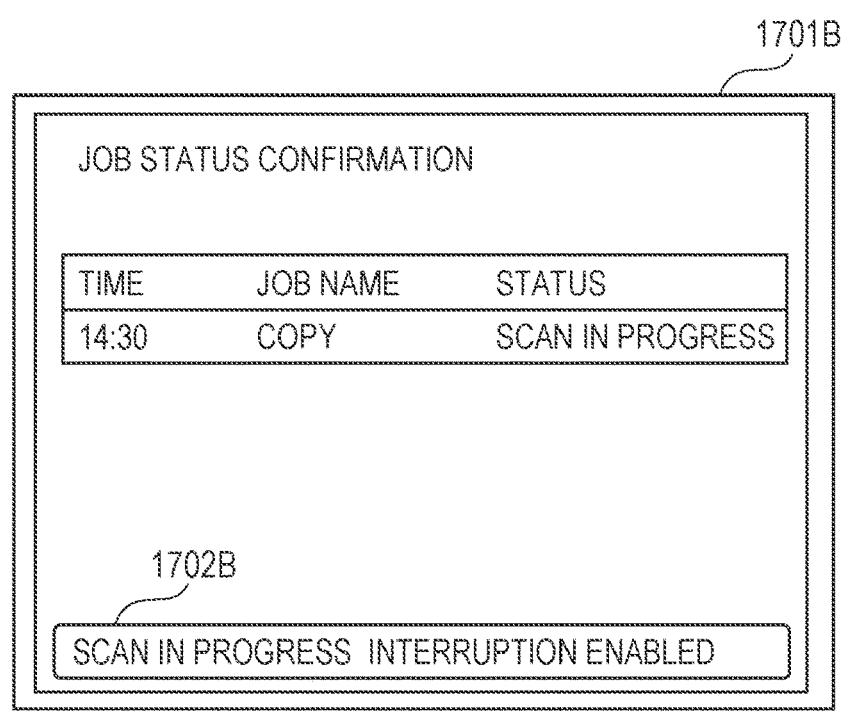

A screen 1701B illustrated in FIG. 17B is a job status confirmation screen. The job status confirmation screen has, displayed therein, the reception time of a currently executed job, the job name, and the status information. The job status confirmation screen is displayed when a job status screen display key of the operation unit 114 is pressed. Information as to whether the interrupt scan is enabled or disabled is displayed in a status line 1702B on the bottom of the job status confirmation screen.

Figure 17C:
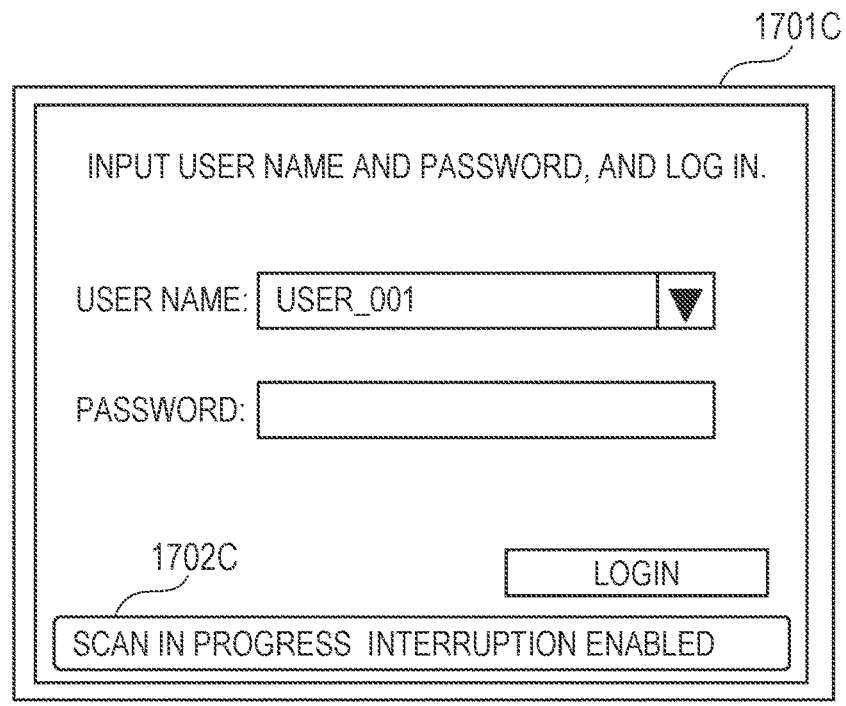
Figure 17D:
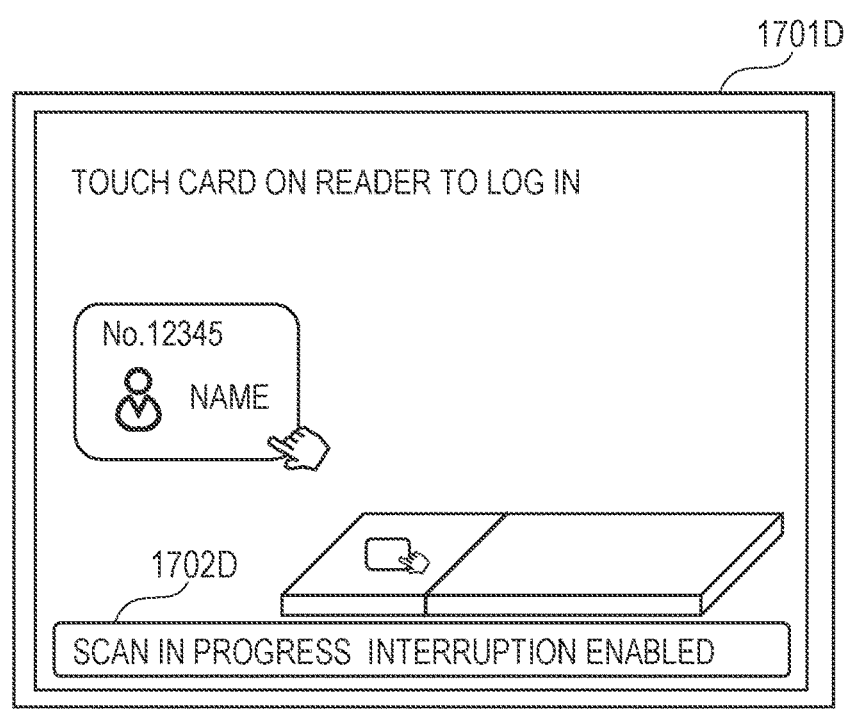

Screens 1701C and 1701D illustrated in FIGS. 17C and 17D are login authentication screens corresponding to FIGS. 9 and 10, respectively. A status line 1702C on the bottom of the screen 1701C indicates whether an interrupt scan is enabled or disabled. In addition, a status line 1702D on the bottom of the screen 1701D displays whether an interrupt scan is enabled or disabled. By displaying the availability of an interrupt scan in the login screen, the user who wants to perform an interrupt scan can confirm the availability of the interrupt scan before logging in. Therefore, the user who wants to perform an interrupt scan need not perform unnecessary login operations if the interrupt scan enable/disable setting is set to "disabled".

FIGS. 17A to 17D illustrate only examples of screens that display the information about the interrupt scan enable/disable setting. It should be noted that the screens that display the information about the interrupt scan enable/disable setting are not limited thereto.

Fourth Embodiment

According to the first embodiment, an example has been described in which an instruction to resume a suspended job is given by the first user who instructed to execute the job.

According to the fourth embodiment, an example is described in which a second user resumes the suspended job.

Figure 19:
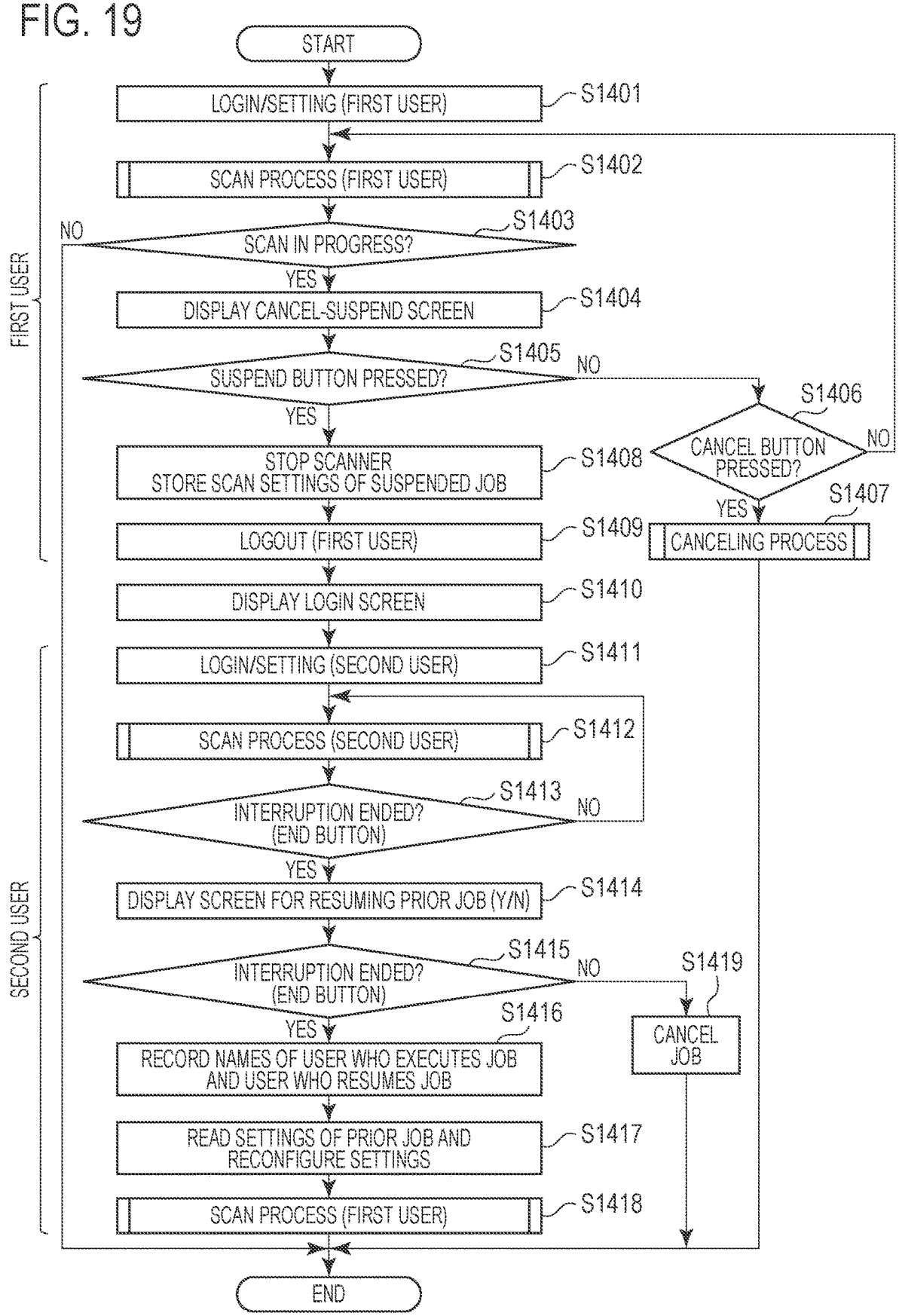
FIG. 19 is a flowchart of the processing according to an embodiment.

FIG. 19 is a flowchart of the processing according to the fourth embodiment. Note that the process represented by the flowchart illustrated in FIG. 19 is accomplished by the CPU 103 loading the program stored in the ROM 102 into the RAM 104 and executing the program.

The processes in steps S1401 to S1413 are the same as those in steps S401 to S413 illustrated in FIG. 4, respectively.

In step S1414, the CPU 103 causes the operation unit 114 to display a screen illustrated in FIG. 8. The difference from the first embodiment is that the second user can instruct to resume the suspended prior scan job without the first user logging in again. If the second user selects the NO (Cancel Job) button 803, the CPU 103 ends the processing. However, if the YES (Start Scan) button 802 is selected, the CPU 103 resumes the execution of the suspended prior scan job. To resume the prior scan job, the second user sets, on the DF, a continuation of the document sheets of the suspended prior scan job and selects the YES (Start Scan) button 802.

If, in step S1415, the CPU 103 determines that the YES (Start Scan) button 802 is selected, the processing proceeds to step S1416. However, if the CPU 103 determines that the NO (Cancel Job) button 803 is selected, the processing proceeds to step S1419.

In step S1416, the CPU 103 stores, in the storage memory 105, the execution history of the selected prior scan job as the history of the first user who has instructed to execute the prior scan job, although the second user is still logged in, More specifically, the history stores the number of scanned document sheets, the scan settings, the execution date and time of the prior scan job, and the like. Note that the CPU 103 stores the history in association with the user name of the second user who has instructed to resume the prior scan job. In addition, the execution history of the interrupt scan job is stored in the storage memory 105 as the history of the second user.

In step S1417, the CPU 103 reads the settings of the prior scan job from the storage memory 105 and reconfigures the settings.

In step S1418, the CPU 103 resumes execution of the prior scan job. After the execution of the prior scan job is completed, the CPU 103 ends the processing represented by the flowchart illustrated in FIG. 19.

When the processing proceeds to step S1419, the CPU 103 cancels the selected prior scan job, Thereafter, the CPU 103 ends the processing.

Through the control performed as described above, the user who has instructed to execute an interrupt scan job can resume the prior scan job after execution of the interrupt scan job is completed, without a user who instructed to execute the prior scan job logging in again.

Fifth Embodiment

According to the second embodiment, the example has been described in which the user who has logged in to the multifunction peripheral instructs to resume the suspended job after the interrupt job is completed.

According to the fifth embodiment, an example is described in which a user who has instructed to execute an interrupt scan can resume the suspended job after the interrupt scan job is completed.

Figure 20:
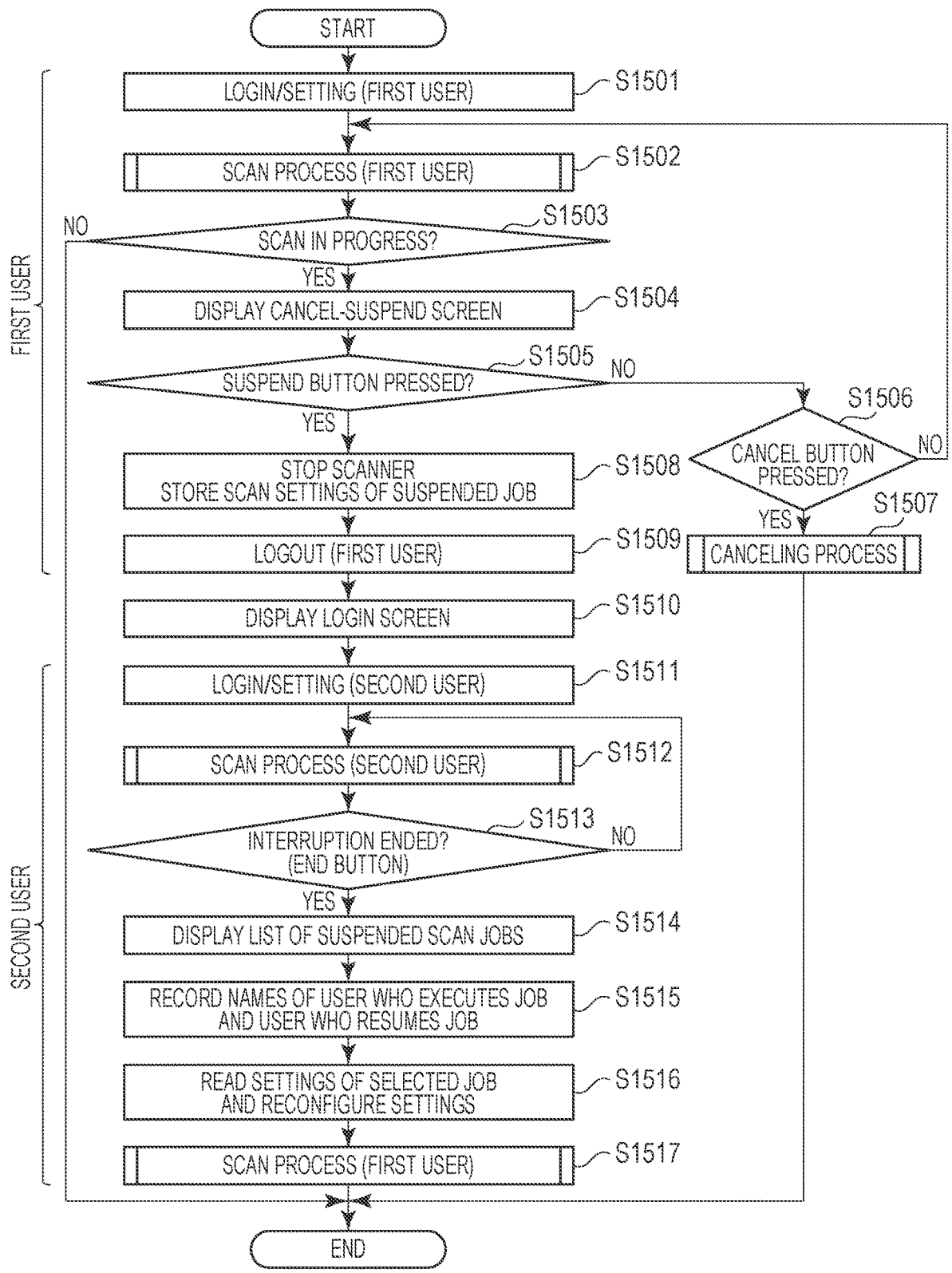
FIG. 20 is a flowchart of the processing according to an embodiment.

FIG. 20 is a flowchart of the process according to the fifth embodiment, Note that the process represented by the flowchart illustrated in FIG. 20 is accomplished by the CPU 103 loading the program stored in the ROM 102 into the RAM 104 and executing the program.

The processes in steps S1501 to S1513 are the same as those in steps S1101 to S1113 illustrated in FIG. 11, respectively.

If, in step S1513, it is determined that YES (end interrupt scan) button is selected, the processing performed by the CPU 103 proceeds to step S1514, where the CPU 103 causes the operation unit 114 to display a job list screen displaying a list of the suspended jobs without performing the logout process for the second user, A screen 1801 illustrated in FIG. 18 is an example of the job list screen displayed at this time. The screen 1801 displays the job name of a suspended job, the name of the user who instructed the execution of the job, and the date and time when the execution of the job was instructed. According to the present embodiment, in addition to the job of the logged-in user "YYY", the scan jobs of users with names other than "YYY", that is, a user with the user name "XXX" and a user with the user name "ZZZ" are also displayed. One record 1802 displays the information regarding one scan job. If the second user selects a suspended scan job in the screen 1801 and selects a YES (Start Scan) button 1803, the CPU 103 resumes the execution of the selected scan job. However, if a NO (Cancel Job) button 1804 is selected, the CPU 103 cancels the selected scan job.

In step S1515, the CPU 103 stores, in the storage memory 105, the history of the prior scan job selected in a screen 2101 as the history of the user who has instructed the execution of the selected prior scan job, although the second user is still logged in. More specifically, the history contains the number of scanned document sheets, the scan settings, the execution date and time of the prior scan job, and the like. The CPU 103 stores the history in association with the user name of the second user who has instructed to resume the prior scan job. In addition, the execution history of the interrupt scan job is stored in the storage memory 105 as the history of the second user.

In step S1516, the CPU 103 loads, from the storage memory 105, the settings of the prior scan job selected in the screen 2101 and reconfigures the settings.

In step S1517, the CPU 103 resumes the execution of the prior scan job. After the execution of the prior scan job is completed, the CPU 103 ends the processing represented by the flowchart illustrated in FIG. 20.

The processes in step S1514 and steps S1516 to S1517 are the same as those in steps S1116 to S1118 illustrated in FIG. 11, respectively.

Through the control performed as described above, the user who has instructed to execute an interrupt scan job can resume the prior scan job after execution of the interrupt scan job is completed, without a user who instructed to execute the prior scan job logging in again.

FIG. 21 illustrates the job history screen according to the fifth embodiment.

If resuming is performed by the second user, the job history screen 1701 displays the user name of the user who has instructed to execute a job and the user name of the second user who has instructed to resume the job, as indicated by a record 1702.

OTHER EMBODIMENTS

According to the above-described embodiments, the CPU 103 may count the number of scanned pages of a prior scan job and store the number of scanned pages in the storage memory 105 when the prior scan job is suspended. Thereafter, to facilitate resuming of the suspended prior scan job, the CPU 103 may display, in the screen for instructing resuming of the job on the operation unit 114, how many pages have been scanned. Alternatively, the CPU 103 may control the operation unit 114 to display a page number from which a scan is to be resumed. In this manner, the user can easily understand from which page the document should be set again.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-138590, filed Jul. 29, 2019, which is hereby incorporated by reference herein in its entirety.

What is claimed is:

1. An image processing apparatus comprising:
a scanner that scans a document sheet;
a memory;
a controller that executes a job for scanning document sheets by the scanner in accordance with an instruction received from a user which has logged in to the image processing apparatus,
wherein the controller suspends the job in accordance with another instruction before scanning of the document sheets is completed,
wherein the controller executes another job for scanning another document sheet by the scanner in a state that the job is being suspended, the another job being a job of another user which has logged in to the image processing apparatus,
wherein, after execution of the another job, the image processing apparatus receives a resuming instruction for resuming the suspended job in a state that the user is not logged in to the image processing apparatus and the another user is logged in to the image processing apparatus,
wherein the controller resumes the suspended job in accordance with reception of the resuming instruction,
wherein the controller stores, in the memory, history information of the job as history information of the user, the history information including user information of the another user,
wherein, after execution of the another job, the image processing apparatus displays suspended jobs, receives selection of a job from among the suspended jobs, and receiving the resuming instruction for resuming the selected job in a state that the user is not logged in to the image processing apparatus and the another user is logged in to the image processing apparatus, and
wherein the controller resumes the selected job in accordance with reception of the resuming instruction.

2. The image processing apparatus according to claim 1, wherein the image processing apparatus receives setting as to whether execution of the another job is permitted or prohibited in a state that the job is being suspended.

3. The image processing apparatus according to claim 2, wherein the image processing apparatus provides notification about the setting.

4. The image processing apparatus according to claim 3, wherein the image processing apparatus provides the notification about the setting via a login screen used for login of the another user.

5. The image processing apparatus according to claim 3, wherein the image processing apparatus provides the notification about the setting via a home screen including an object used to display a setting screen for a copy job and an object used to display a setting screen for a transmission job.

6. The image processing apparatus according to claim 3, wherein the image processing apparatus provides the notification about the setting via a screen that displays a status of a job in progress.

7. The image processing apparatus according to claim 1, wherein the controller suspends the job in accordance with the instruction from the another user before the another user logs in to the image processing apparatus.

8. The image scanning device according to claim 1, wherein the controller suspends the job, the controller stores scan setting of the job in the memory, and then the controller resumes the job based on the scan setting stored in the memory.

9. The image processing apparatus according to claim 1, wherein the job is a copy job that prints an image of a document sheet scanned by the scanner.

10. The image processing apparatus according to claim 1, wherein the job is a transmission job that transmits image data of a document sheet scanned by the scanner.

11. The image processing apparatus according to claim 1, wherein if the controller suspends the job, the scanner does not feed a next document sheet.

12. A method for controlling an image processing apparatus, the image processing apparatus including a scanner that scans a document sheet, a memory and a controller that executes a job, the method comprising:
executing the job for scanning document sheets by the scanner in accordance with an instruction received with a user which has logged in to the image processing apparatus;
suspending the job in accordance with another instruction before scanning of the document sheets is completed;
executing another job for scanning another document sheet by the scanner in a state that the job is being suspended, the another job being a job of another user which has logged in to the image processing apparatus in a state that the job is being suspended;
receiving, after execution of the another job, a resuming instruction for resuming the suspended job in a state that the user is not logged in to the image processing apparatus and the another user is logged in to the image processing apparatus;
resuming the suspended job in accordance with reception of the resuming instruction, and storing, in the memory, history information of the job as history information of the user, the history information including user information of the another user, wherein, after execution of the another job, the image processing apparatus displays suspended jobs, receives selection of a job from among the suspended jobs, and receiving the resuming instruction for resuming the selected job in a state that the user is not logged in to the image processing apparatus and the another user is logged in to the image processing apparatus, and wherein the selected job is resumed in accordance with reception of the resuming instruction.

13. A non-transitory computer-readable storage medium storing computer readable program which, when executed by a computer, performs a method for controlling an image processing apparatus including a scanner that scans a document sheet, a memory and a controller that executes a job, the method comprising:

executing the job for scanning document sheets by the scanner in accordance with an instruction received with a user which has logged in to the image processing apparatus, suspending the job in accordance with another instruction before scanning of the document sheets is completed;

executing another job for scanning another document sheet by the scanner in a state that the job is being suspended, the another job being a job of another user which has logged in to the image processing apparatus in a state that the job is being suspended;

receiving, after execution of the another job, a resuming instruction for resuming the suspended job in a state that the user is not logged in to the image processing apparatus and the another user is logged in to the image processing apparatus;

resuming the suspended job in accordance with reception of the resuming instruction; and storing, in the memory, history information of the job as history information of the user, the history information including user information of the another user, wherein, after execution of the another job, the image processing apparatus displays suspended jobs, receives selection of a job from among the suspended jobs, and receiving the resuming instruction for resuming the selected job in a state that the user is not logged in to the image processing apparatus and the another user is logged in to the image processing apparatus, and wherein the selected job is resumed in accordance with reception of the resuming instruction.

14. The image processing apparatus according to claim 1, wherein execution time of the job is further stored in the memory as history information of the job.

15. The image processing apparatus according to claim 1, wherein scan setting of the job is further stored in the memory as history information of the job.

16. The image processing apparatus according to claim 1, wherein the user information of the another user is a user name of the another user.

* * * * *